(12) United States Patent
Park et al.

(10) Patent No.: US 8,808,614 B2
(45) Date of Patent: Aug. 19, 2014

(54) METHOD OF MANUFACTURING POROUS SINTERED REACTION-BONDED SILICON NITRIDE CERAMICS FROM GRANULAR SI MIXTURE POWDER AND POROUS SINTERED REACTION-BONDED SILICON NITRIDE CERAMICS MANUFACTURED THEREBY

(71) Applicant: Korea Institute of Machinery & Materials, Daejeon (KR)

(72) Inventors: Young Jo Park, Changwon (KR); Boo Won Park, Busan (KR); In Hyuck Song, Changwon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 0 days.

(21) Appl. No.: 14/045,697

(22) Filed: Oct. 3, 2013

(65) Prior Publication Data

US 2014/0035206 A1 Feb. 6, 2014

Related U.S. Application Data

(62) Division of application No. 12/859,457, filed on Aug. 19, 2010, now abandoned.

(30) Foreign Application Priority Data

| Nov. 9, 2009 | (KR) | 10-2009-0107392 |
| Nov. 24, 2009 | (KR) | 10-2009-0114185 |
| Jan. 13, 2010 | (KR) | 10-2010-0003000 |

(51) Int. Cl.
  *C04B 35/65* (2006.01)
  *C04B 35/591* (2006.01)
  *C04B 35/634* (2006.01)
  *C04B 35/626* (2006.01)
  *C04B 38/00* (2006.01)
  *C04B 111/00* (2006.01)

(52) U.S. Cl.
  CPC ............ *C04B 35/65* (2013.01); *C04B 35/591* (2013.01); *C04B 35/63416* (2013.01); *C04B 2235/528* (2013.01); *C04B 2235/3205* (2013.01); *C04B 35/62695* (2013.01); *C04B 2235/656* (2013.01); *C04B 35/62655* (2013.01); *C04B 2235/3852* (2013.01); *C04B 2235/661* (2013.01); *C04B 2235/3217* (2013.01); *C04B 2235/5427* (2013.01); *C04B 2111/00793* (2013.01); *C04B 2235/80* (2013.01); *C04B 2235/5436* (2013.01); *C04B 2235/662* (2013.01); *C04B 2235/3208* (2013.01); *C04B 2235/767* (2013.01); *C04B 2235/81* (2013.01); *C04B 2235/428* (2013.01); *C04B 38/0022* (2013.01); *C04B 2235/3222* (2013.01); *C04B 2235/3225* (2013.01)
  USPC ........................................................ 264/683

(58) Field of Classification Search
  USPC ........................................................ 264/683
  See application file for complete search history.

(56) References Cited

U.S. PATENT DOCUMENTS 3,778,231 A * 12/1973 Taylor ........................... 423/344
3,950,464 A * 4/1976 Masaki ......................... 264/668

(Continued)

*Primary Examiner* — Joseph S Del Sole
*Assistant Examiner* — Russell Kemmerle, III

(57) ABSTRACT

Disclosed is a porous sintered reaction-bonded silicon nitride ceramic, which includes an array of sintered granules having fine pore channels in the sintered granules and coarse pore channels formed between the sintered granules, and in which the pore channel size is controlled so that both coarse pores and fine pores are formed together in the ceramic, thus simultaneously enhancing air permeability and capturing efficiency. A method of manufacturing the porous sintered reaction-bonded silicon nitride ceramic is also provided.

4 Claims, 20 Drawing Sheets

(56) References Cited

U.S. PATENT DOCUMENTS

| | | | |
|---|---|---|---|
| 4,127,630 A * | 11/1978 | Washburn | 264/662 |
| 4,410,636 A * | 10/1983 | Minjolle et al. | 501/97.2 |
| 4,443,394 A * | 4/1984 | Ezis | 264/659 |
| 4,552,851 A * | 11/1985 | Hsieh | 501/97.2 |
| 4,563,433 A * | 1/1986 | Yeckley et al. | 501/98.2 |
| 4,687,655 A * | 8/1987 | Hunold et al. | 423/344 |
| 5,166,106 A * | 11/1992 | Edler et al. | 501/97.2 |
| 5,384,290 A * | 1/1995 | Brezny | 501/81 |
| 5,401,450 A * | 3/1995 | Mitomo et al. | 264/676 |
| 5,876,660 A * | 3/1999 | Wordsworth et al. | 264/647 |
| 5,998,317 A * | 12/1999 | Sterzel | 501/80 |
| 6,610,113 B1 * | 8/2003 | Mehrotra et al. | 51/308 |
| 6,737,010 B2 * | 5/2004 | Mehrotra et al. | 264/604 |
| 6,789,498 B2 * | 9/2004 | Kaushal et al. | 118/723 R |
| 6,846,764 B2 * | 1/2005 | Inoue et al. | 501/97.1 |
| 7,368,076 B2 * | 5/2008 | Miyakawa et al. | 264/628 |
| 7,763,205 B2 * | 7/2010 | Voiles et al. | 264/683 |
| 2002/0105116 A1 * | 8/2002 | Mehrotra et al. | 264/641 |
| 2004/0026813 A1 * | 2/2004 | Mehrotra et al. | 264/129 |
| 2006/0087060 A1 * | 4/2006 | Voiles et al. | 264/607 |
| 2011/0111205 A1 * | 5/2011 | Park et al. | 428/313.9 |
| 2012/0196125 A1 * | 8/2012 | Park et al. | 428/402 |

* cited by examiner heat treatment

METHOD OF MANUFACTURING POROUS SINTERED REACTION-BONDED SILICON NITRIDE CERAMICS FROM GRANULAR SI MIXTURE POWDER AND POROUS SINTERED REACTION-BONDED SILICON NITRIDE CERAMICS MANUFACTURED THEREBY

The present application is a divisional of U.S. patent application Ser. No. 12/859,457, filed on Aug. 19, 2010, which claims priority of Korean Patent Application Number 10-2009-0107392, filed on Nov. 9, 2009, Korean Patent Application Number 10-2009-0114185, filed on Nov. 24, 2009, and Korean Patent Application Number 10-2010-0003000, filed on Jan. 13, 2010, which are incorporated by reference in their entirety.

BACKGROUND OF THE INVENTION

1. Technical Field

The present invention relates to a method of manufacturing porous sintered reaction-bonded silicon nitride ceramics and porous sintered reaction-bonded silicon nitride ceramics manufactured thereby. More particularly, the present invention relates to a method of manufacturing a porous sintered reaction-bonded silicon nitride ceramics, which controls a pore structure so that the specific surface area of pores is increased to improve capturing performance and coarse pores are formed to enhance air permeability, and to a porous sintered reaction-bonded silicon nitride ceramics manufactured using the same.

2. Description of the Related Art

Silicon nitride based materials are superior in terms of strength, toughness, impact resistance, heat resistance and corrosion resistance despite being lightweight, and thus have been widely used in fields requiring good thermo-mechanical properties and chemical resistance.

Conventionally, silicon carbide based porous materials have been mainly utilized in fields requiring thermo-mechanical properties and chemical resistance, but are problematic because silicon carbide has low thermal shock resistance and high hardness, and thus wears a mold upon extrusion, undesirably considerably shortening the lifetime thereof, and also because silicon carbide is sintered at a high temperature equal to or higher than 2000° C., undesirably increasing the cost of preparation.

The porous silicon nitride based materials which have superior heat resistance, mechanical properties and corrosion resistance as mentioned above are considered to be promising for use in filters, catalyst supports, heat insulating materials, filters for high-temperature and high-pressure gas, and diesel particulate filters, in lieu of silicon carbide based materials.

However, research into silicon nitride based materials is mainly focused on making the microstructure thereof dense so as to enhance thermo-mechanical properties, and thus methods of manufacturing the porous silicon nitride based materials have not yet been sufficiently studied to date.

As one example of the techniques for manufacturing porous silicon nitride ceramics, there is Korean Unexamined Patent Publication No. 1995-702510 which discloses a method of manufacturing porous silicon nitride ceramics composed of silicon nitride ($Si_3N_4$) and a rare earth element compound and/or a transition metal compound so as to be used as a filter for removing impurities or a catalyst support. According to this method, a compact of mixture powder is thermally treated at temperature equal to or higher than 1500° C., thus manufacturing the porous ceramic having a porosity of 30% or more.

In addition, Korean Patent No. 10-0311694 discloses a method of manufacturing porous sintered silicon oxynitride ceramics adapted for the refractory tiles of space shuttles. This method includes agglomerating a low-melting-point powder composition composed of 11~16 wt % of $Si_3N_4$, 3~5 wt % of AlN, 35~45 wt % of $Al_2O_3$ and 35~45 wt % of $Y_2O_3$, adding 10~25 wt % of the agglomerated low-melting-point powder to β-Sialon silicon oxynitride powder composed of 57~100 wt % of $Si_3N_4$, 0~9 wt % of $Al_2O_3$ and 0~33 wt % of AlN, compacting this powder mixture, and sintering the compact at 1600~1700° C. for 1~8 hours, thus obtaining the porous sintered silicon oxynitride ceramics.

In addition, Japanese Unexamined Patent Publication No. Hei. 9-100179 discloses a method of manufacturing a porous silicon nitride ceramics usable as a filter or a catalyst support. This method includes bringing the porous ceramic composed mainly of silicon nitride into contact with an acid and/or an alkali so that part or all of the components other than silicon nitride are dissolved, thus manufacturing the porous ceramic.

However, because all the above methods use the expensive silicon nitride, the actual use thereof is basically limited, and also, methods used to form pores are not practical. For example, in the case of Korean Patent No. 10-311694, in order to form pores in the sintered ceramic, the low-melting-point powder composition is compacted into agglomerates, after which the compact thus obtained is mixed with the high-melting-point powder composition, so that the pores are ensured depending on the size of the agglomerated compact. Upon mixing, however, it is difficult for the compact to maintain its shape. If the shape of the compact aims to be maintained, sufficient mixing is impossible. Moreover, it is difficult to consistently control the manufacturing process, and the manufacturing cost cannot but increase. Also, as in Japanese Unexamined Patent Publication No. Hei. 9-100179, the pore formation method which includes chemically treating the manufactured porous ceramic requires additional chemical treatment, and furthermore, if the components between the silicon nitride particles are dissolved, whether the structure of the ceramic is maintained by the silicon nitride backbone cannot be ensured.

SUMMARY OF THE INVENTION

With the goal of solving the conventional problems, the present inventors proposed a method of manufacturing a silicon nitride filter for automobiles by mixing silicon (Si) with a sintering additive, namely, a rare earth metal oxide, a rare earth metal oxide/alumina or a rare earth metal oxide/magnesia, compacting the mixture, burning the compact in a medium temperature range in a nitrogen atmosphere thus obtaining reaction-bonded silicon nitride which is then sintered in a high temperature range (Patent Application No. 10-2008-0040395).

This method is advantageous because silicon which is inexpensive is used as the starting material, and thus the resultant filter is superior in mechanical properties including thermal shock resistance and strength, and thermal stability, and is thus able to be actually utilized in diesel particulate filters. Furthermore, the particles are made acicular and the aspect ratio thereof is optimized, and thus fine dust that cannot be filtered by means of conventional diesel particulate filters is able to be filtered, and the sintering process is possible at lower temperature, effectively decreasing the manufacturing cost.

However, the above method is problematic because the pore size is limited due to the gas-solid nitridation mechanism and the particle size of post-sintered silicon nitride, making it impossible to form pore channels having the desired size.

Accordingly, the present invention has been made keeping in mind the problems encountered in the related art and the present invention is intended to provide a porous sintered reaction-bonded silicon nitride ceramic which ensures that pore channels have a sufficient size, and a method of manufacturing the same.

On the other hand, according to the prior invention, fine pore channels which are relatively uniform are formed. In the case where a porous ceramic having such fine pore channels having a uniform size is applied to a diesel particulate filter, particulate capturing efficiency is high but air permeability is not ensured attributable to the size of fine pore channels, undesirably causing large back pressure when the filter is operated, and consequently performance of the system to which the corresponding filter is mounted may deteriorate.

Accordingly, the present invention is intended to provide a porous sintered reaction-bonded silicon nitride ceramic in which the pore channel size is controlled so that both coarse pores and fine pores are formed together in the ceramic thus simultaneously increasing air permeability and capturing performance, and a method of manufacturing the same.

Also the present invention is intended to provide granular powder for sintered reaction-bonded silicon nitride ceramics, having strength adapted for compacting, and a compact of the granule powder.

An aspect of the present invention provides a porous sintered reaction-bonded silicon nitride ceramic, including an array of sintered granules having fine pore channels in the sintered granules and coarse pore channels formed between the sintered granules.

In this aspect, the porous sintered reaction-bonded silicon nitride ceramic may exhibit a bimodal pore distribution having a first peak and a second peak having a pore size larger than that of the first peak, and the first peak is based on the fine pore channels and the second peak is based on the coarse pore channels.

In this aspect, the pore size of the first peak may fall in a range of less than 1 μm, and the pore size of the second peak preferably falls in a range of 1 μm or more, and more preferably falls in a range of 5~20 μm.

In this aspect, the average diameter of the sintered granules may fall in a range of 30~150 μm.

In this aspect, the maximum frequency diameter of the sintered granules may fall in a range of 50~150 μm.

Another aspect of the present invention provides a method of manufacturing a porous sintered reaction-bonded silicon nitride ceramic, including granulating a material composed of silicon and a sintering additive for preparing a sintered reaction-bonded silicon nitride from the silicon, thus obtaining material granules; subjecting the material granules to pressureless compacting in a mold, thus producing a material compact; and subjecting the material compact to reaction-bonding in a nitriding gas atmosphere and post-sintering in a nitrogen atmosphere.

In this aspect, the sintering additive may include yttria and alumina, and may be used in an amount of 2~10 wt % based on complete nitridation of the silicon.

In this aspect, the maximum weight frequency of the granules may fall in a range of 30~150 μm.

A further aspect of the present invention provides a method of manufacturing a porous sintered reaction-bonded silicon nitride ceramic, including granulating a material comprising silicon and a sintering additive for preparing a sintered reaction-bonded silicon nitride from the silicon, thus obtaining material granules; pre-sintering the material granules in an inert atmosphere, thus obtaining pre-sintered granules; subjecting the pre-sintered granules to pressing, thus producing a material compact; and subjecting the material compact to reaction-bonding in a nitriding gas atmosphere and post-sintering in a nitrogen atmosphere.

In this aspect, the sintering additive may include at least one of alkali earth metal oxides.

In this aspect, post-sintering may be performed at 1700~1900° C.

In this aspect, the sintering additive may be used in an amount of 2~10 wt % based on complete nitridation of the silicon.

In this aspect, pressing may be performed at a pressure of 1~20 MPa.

Still another aspect of the present invention provides pre-sintered granular powder for sintered reaction-bonded silicon nitride ceramics, which is spherical porous granules having open pores and composed of silicon and a sintering additive for high-temperature liquid sintering conducted after nitridation of the silicon, the sintering additive including yttria, alumina and a compound thereof, the granules having a yield strength of 1~20 MPa. As such, the yield strength of the granular powder may be 5 MPa or more.

In this aspect, the granular powder may have flowability of 0.2~0.5 g/sec.

Yet another aspect of the present invention provides a compact for sintered reaction-bonded silicon nitride ceramics, which is a compact of spherical porous granules having fine pore channels and composed of silicon and a sintering additive for high-temperature liquid sintering conducted after nitridation of the silicon, the sintering additive including yttria, alumina and a compound thereof, the porous granules having a maximum weight frequency in a range of 30~150 μm, the compact having a pore structure including fine pore channels in the porous granules and coarse pore channels between the porous granules.

In this aspect, the coarse pore channels may include coarse pores of 1 μm or more.

BRIEF DESCRIPTION OF THE DRAWINGS

The features and advantages of the present invention will be more clearly understood from the following detailed description taken in conjunction with the accompanying drawings, in which.

DESCRIPTION OF SPECIFIC EMBODIMENTS

Figure 1:
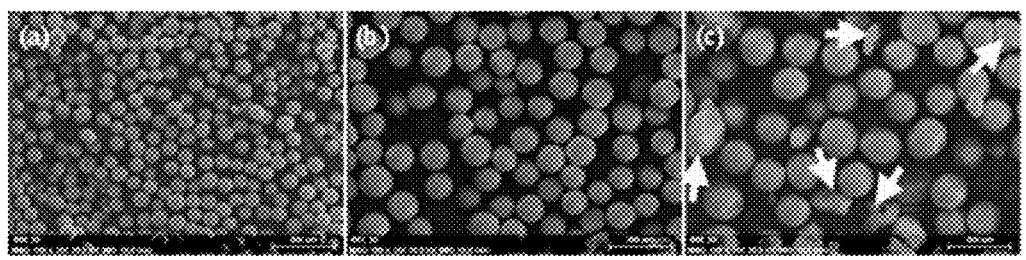
FIGS. 1A, 1B and 1C are photographs showing raw granules having various sizes sorted using sieving according to an embodiment of the present invention.

Hereinafter, a detailed description will be given of the present invention with reference to the appended drawings.

In the present invention, the term "pressureless compacting" is used to include the meaning of a mold being packed with powder by tapping using for example vibrations or shaking of the mold, as well as including the typical meaning of a mold being packed using the own weight of the powder instead of applying pressure when compacting the powder.

Also in the present invention, the term "reaction-bonding" indicates a process of simultaneously generating a chemical reaction and the sintering of a material into a desired target compound using thermal treatment. The term "reaction-bonding" originally represents the features of the process but is currently used to specify a sintered ceramic, for example, sintered reaction-bonded silicon nitride (SRBSN) resulting from nitridation and sintering of a silicon precursor.

A. Granulation of Material Powder Including Si+ Sintering Additive

In the present invention, granular powder was manufactured using a spray drying process. The granular powder includes silicon (Si) and a sintering additive for accelerating the nitridation and sintering of Si. Examples of the sintering additive for sintering silicon nitride may include a typical binary high-melting-point sintering additive composed of yttria and alumina, and ternary or more low-melting-point sintering additives further including an alkali earth metal oxide such as MgO, CaO, SrO, BaO or the like in addition to the binary sintering additive composition. Furthermore, a $SiO_2$ film is typically formed on the surface of Si, and this $SiO_2$ film may support the sintering in a subsequent sintering process along with the sintering additive.

The sintering additive may be used in an amount of 2~10 wt % based on $Si_3N_4$ resulting from the complete nitridation of Si. In the present invention, as the amount of sintering additive increases, the strength of the sintered ceramic may be enhanced.

In an embodiment according to the present invention, as shown in Table 1 below, Si powder was mixed with a sintering additive including high-melting-point YA ($Y_2O_3$—$Al_2O_3$, $T_{eu}$=1370° C.) or low-melting-point YAC ($Y_2O_3$—$Al_2O_3$—CaO, $T_{eu}$=1170° C.) and then granulated at different atomizer rotation speeds (1,000 and 10,000 rpm).

Also, a spray slurry was prepared using ball milling. As such, the ratio of solid and water was 1:1, and the sintering additive was added in an amount of 3 wt % based on $Si_3N_4$ resulting from the complete nitridation of Si. Furthermore, a dispersant was used in the amount of 0.1~0.8 wt % based on solid content (Si+ sintering additive), and a binder was used in the amount of 2~5 wt % based on solid content (Si+ sintering additive). Upon spray drying, the rotation speed of the stirrer was 100 rpm, and the inlet and outlet temperatures thereof were maintained at 150~300° C. and 80~120° C., respectively.

TABLE 1

| Sintering additive | | Temp. | Pre-Sintering | Strength of Granules | Molding Process |
|---|---|---|---|---|---|
| YA | $Y_2O_3$—$Al_2O_3$—($SiO_2$) | 1370 °C. | x | Weak | Tapping, Pressureless Compacting |
| YAC | $Y_2O_3$—$Al_2O_3$—CaO—($SiO_2$) | 1170 °C. | o | Strong | Uniaxial Pressing, Extrusion |

Because of the spray drying, coarse granules (50~250 μm) were formed under conditions of the low-speed atomizer (1,000 rpm), and the yield of granules was low on the order of 1% or less for 100 g of Si loaded. Also, the yield was 40% or more at 10,000 rpm. The granule size and the yield were increased in proportion to an increase in the loaded amount and the amount of added binder. The granule size was similar but the yield was greater when using the YAC type sintering additive than when using the YA type sintering additive (Table 2).

TABLE 2

| Sample | Sintering additive | PVA (wt %) | Rotation Speed (rpm) | Granule Size (μm) | Yield for 100 g of Si Loaded (%) |
|---|---|---|---|---|---|
| SD4 | YA | 2 | 10,000 | 30~150 | 43.7 |
| SD5 | YA | 5 | 10,000 | 30~150 | 57.1 |
| SD6 | YAC | 2 | 10,000 | 30~250 | 69.8 |

Figure 10:
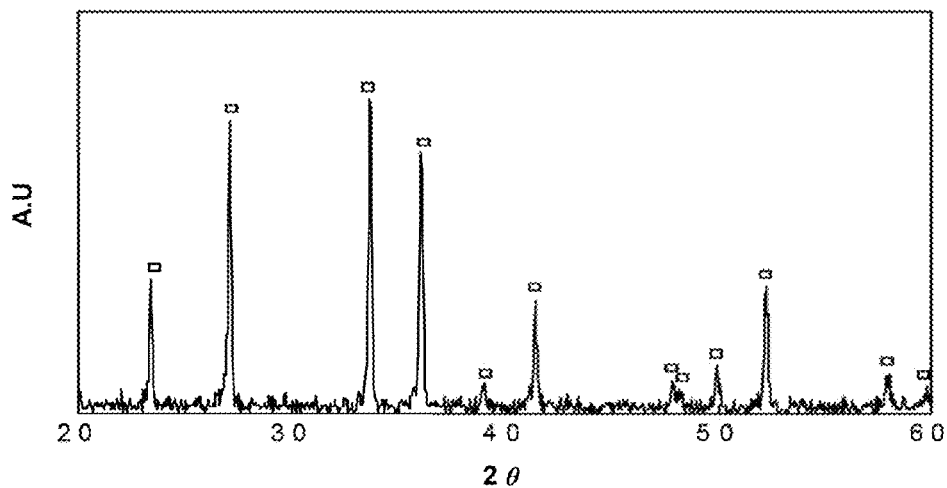
FIG. 10 is a graph showing results of analysis of X-ray diffraction (XRD) of SD5-SRBSN according to an embodiment of the present invention.

Subsequently, SD4 ($Y_2O_3$:$Al_2O_3$=2:1; PVA 2 wt %) granules were sorted using sieving and the outer appearance thereof was then observed using a scanning electron microscope (SEM). FIG. 1A shows granules having a size of 45~63 μm (which is referred to as "m54" corresponding to the mean granule size), FIG. 1B shows granules having a size of 90~125 μm (m107.5), and FIG. 10 shows granules having a size of 125~150 μm (m137.5). From these photographs, small granules can be seen to have maintained their spherical shape and suffered only slight damage (FIGS. 1A and 1B), whereas large granules are observed to be partially damaged due to the impacts received upon sieving (the arrows in FIG. 1C).

Figure 2:
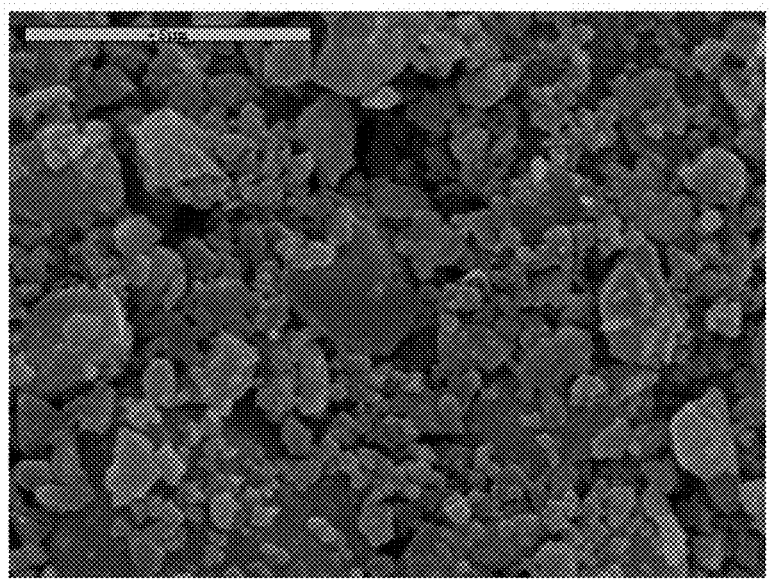
FIG. 2 is an enlarged photograph of the raw granules according to the embodiment of the present invention.

FIG. 2 is an enlarged photograph of the surface of the granules composed of particles smaller than the starting Si having an average particle size of 2 μm. This is considered to be because the particle size of the added sintering additive is smaller than that of Si and also because the Si particles which are a main material are pulverized in the course of milling, thus reducing the average particle size.

Figure 3:
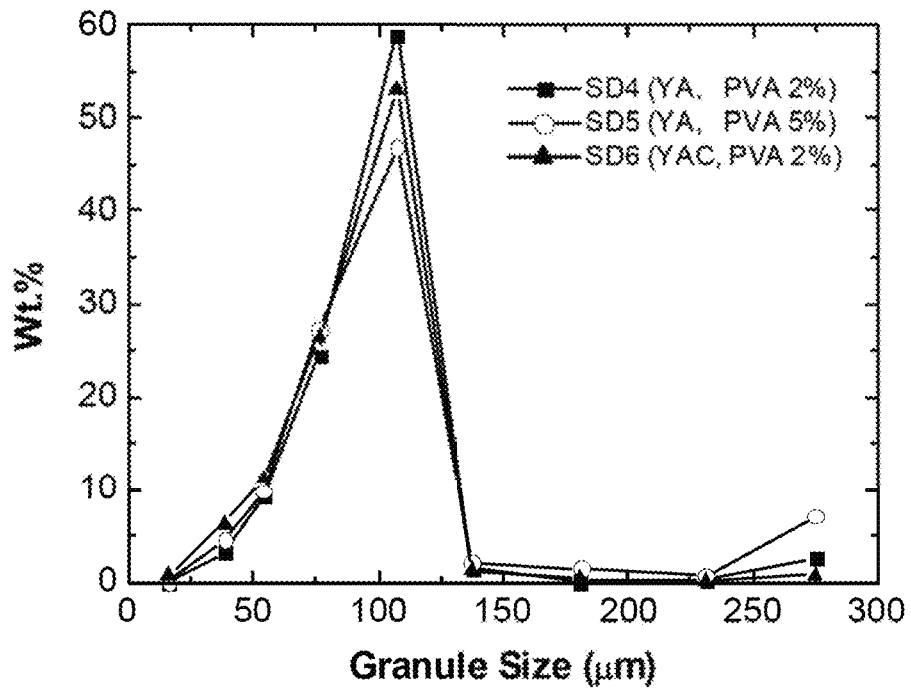
FIG. 3 is a graph showing the weight distribution of samples sorted using sieving according to an embodiment of the present invention.

Also, the weight distribution in relation to the size of sieved granules was measured, and this showed that the size distribution is similar regardless of the sintering additive composition and the amount of added binder under conditions of the same atomizer rotation speed (FIG. 3). Almost all particles of respective samples as a result of sieving can be seen to have a size of 30~150 μm, and about 50 wt % of the granules are present in the size range of 90~106 μm.

B. Manufacture of Porous Sintered Reaction-Bonded Silicon Nitride Ceramic Using Pressureless Packing (1) Pressureless Packing Pressureless compacting was performed using a granular powder composition including a high-melting-point YA type sintering additive as shown in Table 3 below. In Table 3, the amounts of respective components are given based on 100 g of Si loaded, and SD5 granules including a sintering additive are represented by 97 wt % $Si_3N_4$-2 wt % $Y_2O_3$-1 wt % $Al_2O_3$ under conditions of the complete nitridation of Si. In Table 3 below, SD51 is a composition in which the amount of sintering additive is doubled (94 wt % $Si_3N_4$-4 wt % $Y_2O_3$-2 wt % $Al_2O_3$) compared to SD5.

In order to evaluate the properties and phase of a microstructure in terms of for example porosity, coarse pore channel size and specific surface area of pores depending on the granule size, the granules were sieved and sorted into granules having the mean granule size of 38.5 μm (in the range of 32~45 μm), granules having the mean granule size of 54 μm (in the range of 45~63μ), granules having the mean granule size of 76.5 μm (in the range of 65~90 μm) and granules having the mean granule size of 107.5 μm (in the range of 90~125 μm). For comparison, unsieved granules (as-SD) were also prepared. Below, respective specimens were expressed by m38.5, m54, m76.5, m107.5 and as-SD. In the case of sorted granules using sieving, coarse granules having a size of 125 μm or more were not tested. The unsieved as-SD includes granules smaller than 32 μm and coarse granules greater than 125 μm.

TABLE 3

| Sample | Si | $Y_2O_3$ | $Al_2O_3$ | PAA | PVA |
|---|---|---|---|---|---|
| SD5 | 100 | 3.43 | 1.72 | 0.53 | 5.26 |
| SD51 | 100 | 7.09 | 3.54 | 0.55 | 5.53 |

The pressureless compacting was performed through tapping so as to pack a mold with powder.

The mold used was a cylindrical graphite mold having an inner diameter of 30 mm, and a plurality of holes was formed in the upper plate and another in the lower plate of the mold so as to enable inflow and outflow of the nitriding gas. The thickness of a disk specimen was maintained uniform by the two plates. About 2 g of granules were charged into the mold, and then tapped so as to obtain a compact about 4 mm thick. The density of the tapped compact was about 0.71 g/cm³ and the packing ratio was about 30%.

(2) Nitridation and Sintering of Granular Powder Compact

The granular powder compacts (SD5, SD51) were nitrided. The nitridation was carried out using a tube furnace at 1450° C. Subsequently, the nitrided specimens (respectively referred to as "SD5-RBSN" and "SD51-RBSN") were post-sintered at 1700° C. in a nitrogen atmosphere of 0.1 MPa for 2 hours, thus manufacturing post-sintered specimens (respectively referred to as "SD5-SRBSN" and "SD51-SRBSN").

Figure 4:
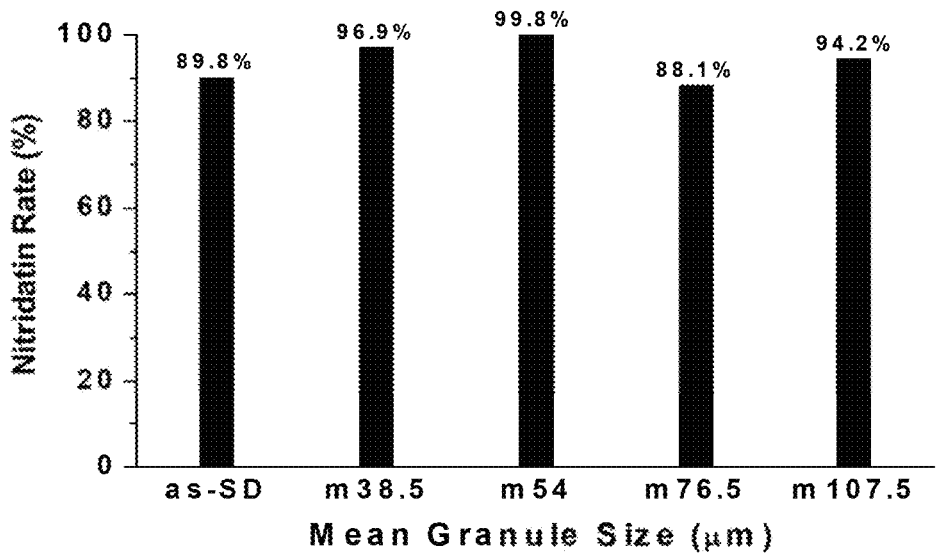
FIG. 4 is a graph showing the nitridation rate of the nitrided specimens according to an embodiment of the present invention.

FIG. 4 is a graph showing the nitridation rate of SD5-RBSN. When the nitridation rate of 90% or more is obtained based on loss due to volatilization of a material during nitridation, the nitridation is typically regarded as being completed. In the present test, when the specimen denoting the lowest nitridation rate was subjected to XRD, residual Si was not detected, and thus the nitridation was confirmed to be completed in all the specimens.

Figure 5:
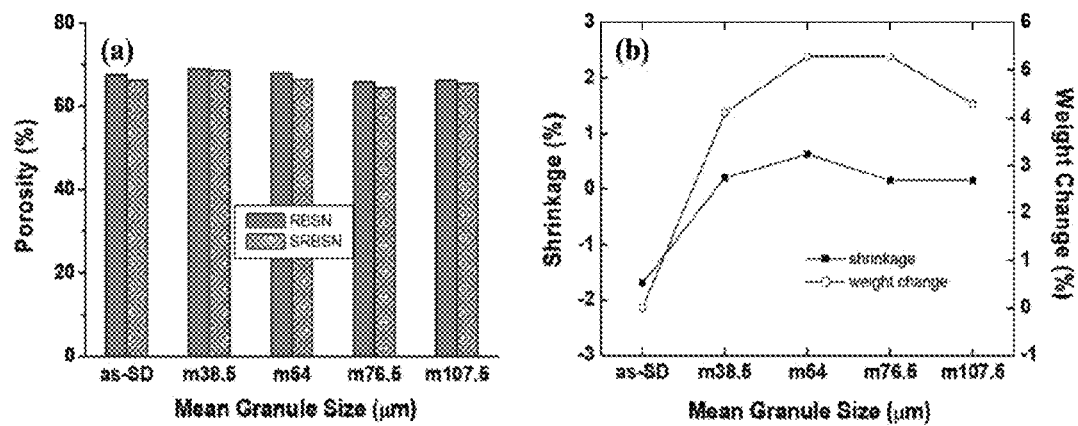
FIG. 5A is a graph showing the porosity of SD5-RBSN and SD5-SRBSN specimens according to an embodiment of the present invention.
FIG. 5B is a graph showing the shrinkage and weight change of SD5-SRBSN.
Figure 6:
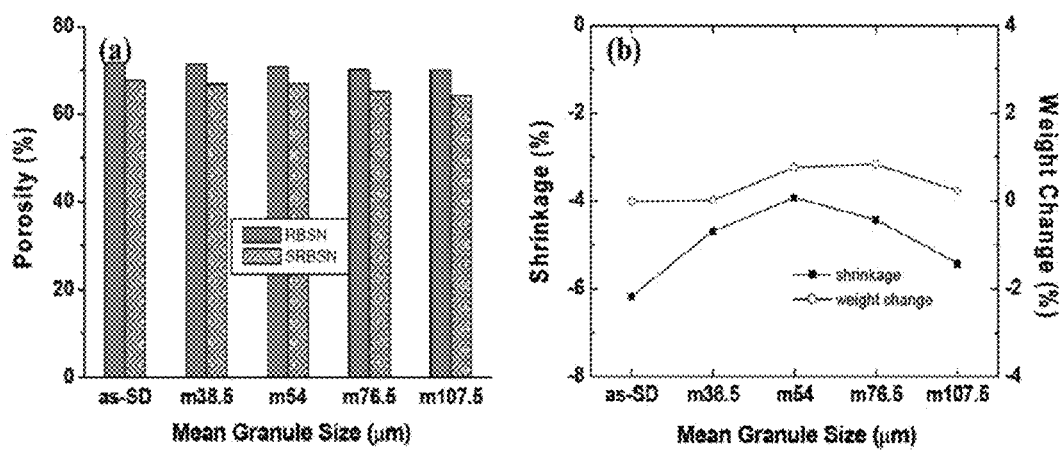
FIG. 6A is a graph showing the porosity of SD51-RBSN and SD51-SRBSN specimens.
FIG. 6B is a graph showing the shrinkage and weight change of SD51-SRBSN.

FIG. 5A is a graph showing the porosity of SD5-RBSN and SD5-SRBSN, FIG. 5B is a graph showing the shrinkage and weight change of SD5-SRBSN, and FIG. 6A is a graph showing the porosity of SD51-RBSN and SD51-SRBSN, and FIG. 6B is a graph showing the shrinkage and weight change of SD51-SRBSN.

With reference to FIGS. 5A and 5B, all the specimens show a porosity of about 65~70% regardless of the granule size. The reason why the porosity of SD5-SRBSN is smaller than that of SD5-RBSN despite the shrinkage of SD5-SRBSN being approximately zero is considered to be because the packing powder is charged in the porous specimen in the course of post-sintering, thus increasing the weight.

On the other hand, in the case of SD51-RBSN in which the amount of sintering additive is doubled, the porosity thereof can be seen to be slightly larger than that of SD5-RBSN (FIGS. 6A and 6B). This is considered to be because low-density k-phase (YSiO$_2$N, $\rho$=0.714 g/cm$^3$) is deposited due to the use of the sintering additive the amount of which has increased. In the case of SD51-SRBSN, the weight seldom changes and the shrinkage is determined to be 4~6%, thus reducing the porosity. Furthermore, the porosity can be seen to be about 65% at different granule sizes.

Figure 7:
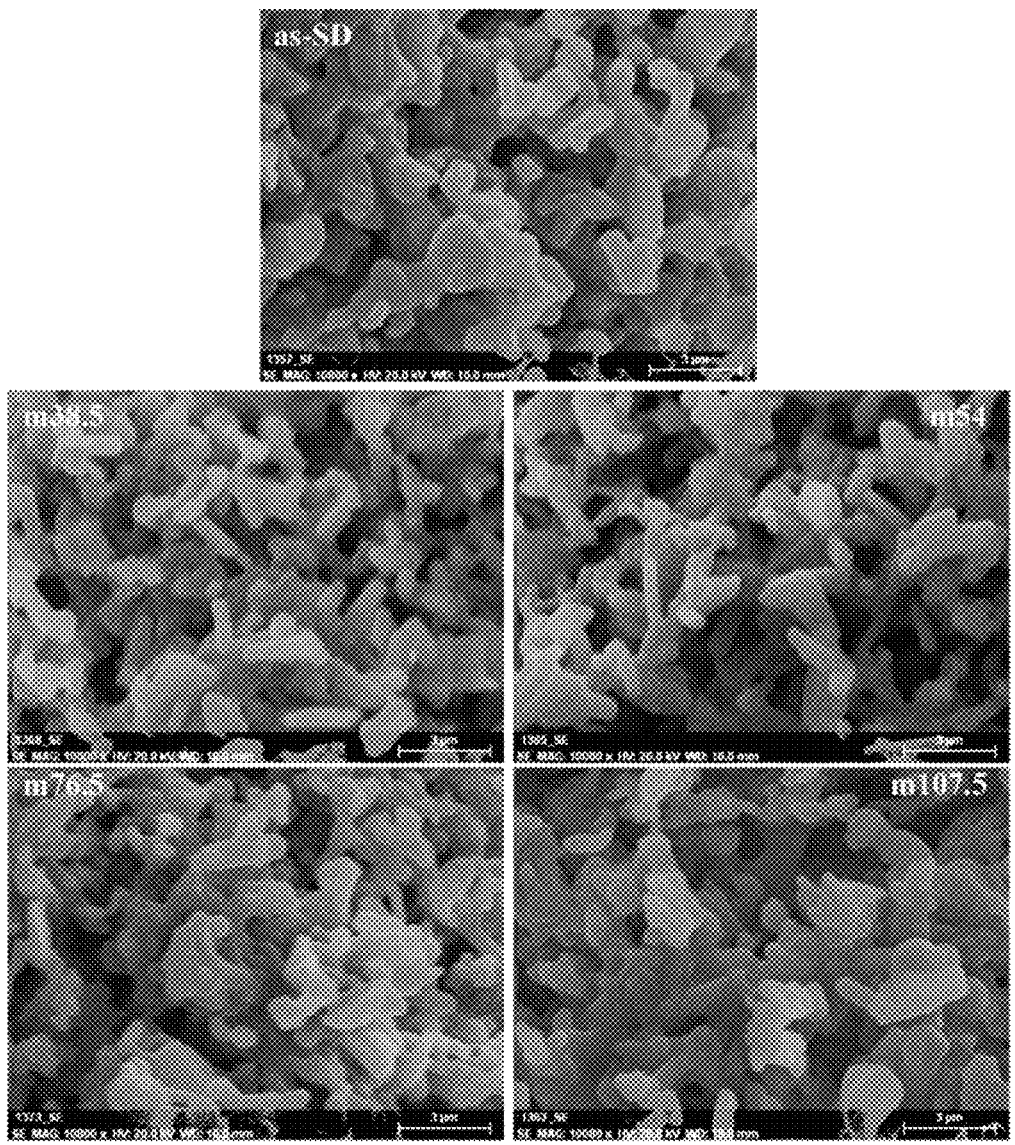
FIG. 7 is of scanning electron micrographs showing SD51-SRBSN according to an embodiment of the present invention.

FIG. 7 is of SEM photographs showing SD51-SRBSN, from which intrinsic acicular morphology of silicon nitride particles can be seen to be developed through post-sintering. Such a microstructure enlarges the specific surface area of the pores and also forms a complicated pore channel structure, and is thus expected to increase the efficiency with which fine dust is captured.

Figure 8:
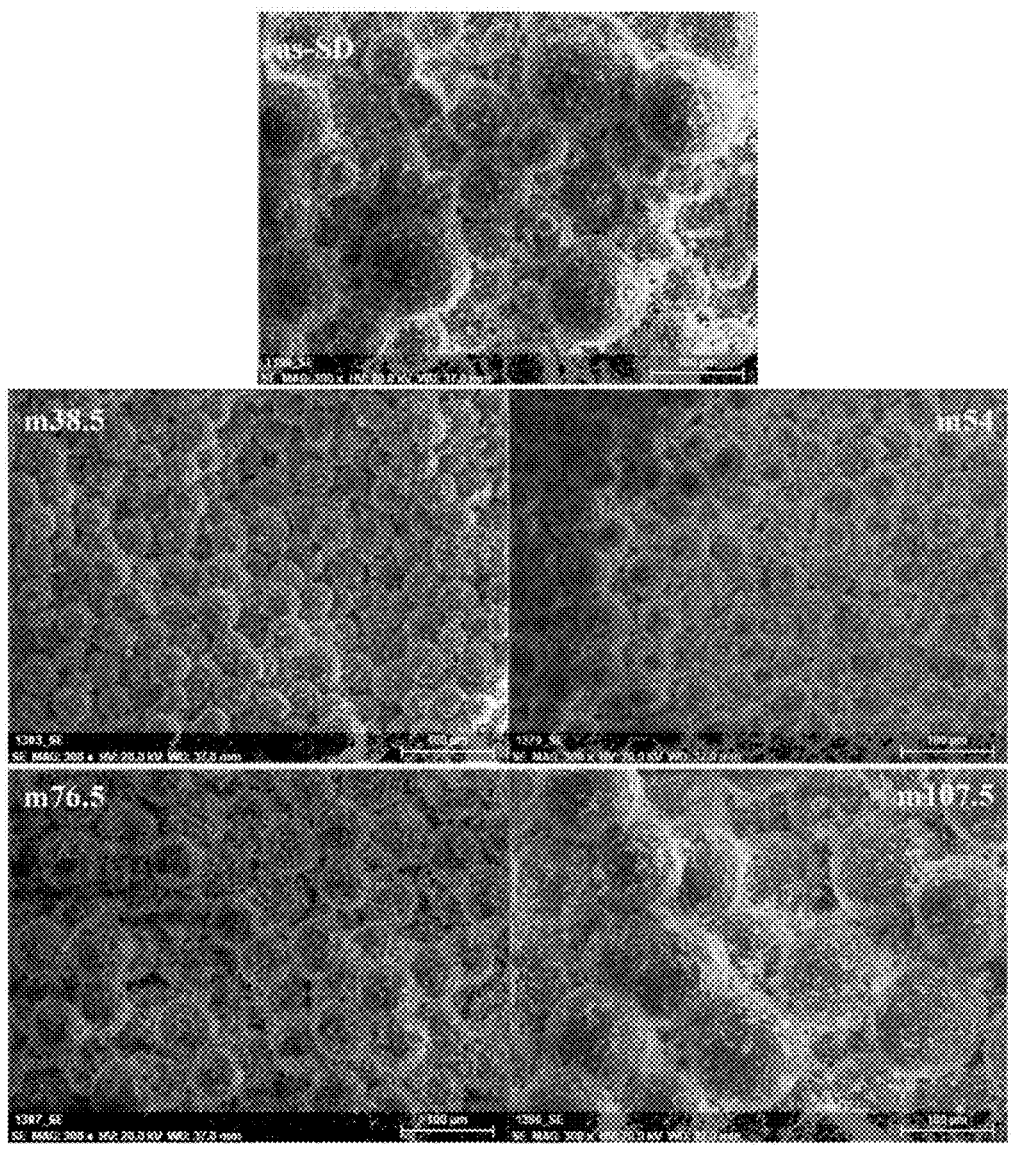
FIG. 8 is of scanning electron micrographs showing the fracture surface of SD5-SRBSN at different granule sizes according to an embodiment of the present invention.

FIG. 8 is of SEM photographs showing the fracture surface of SD5-SRBSN at different granule sizes. From this, raw granules having low strength can be seen to be manufactured into a porous ceramic in which a spherical shape of granules is maintained using tapping, reaction-bonding and post-sintering. Moreover, silicon nitride in a whisker phase which is observed with white contrast in the void space between the granules plays a role in increasing the specific surface area of a filter and thus has a favorable influence on capturing nano particles.

Figure 9:
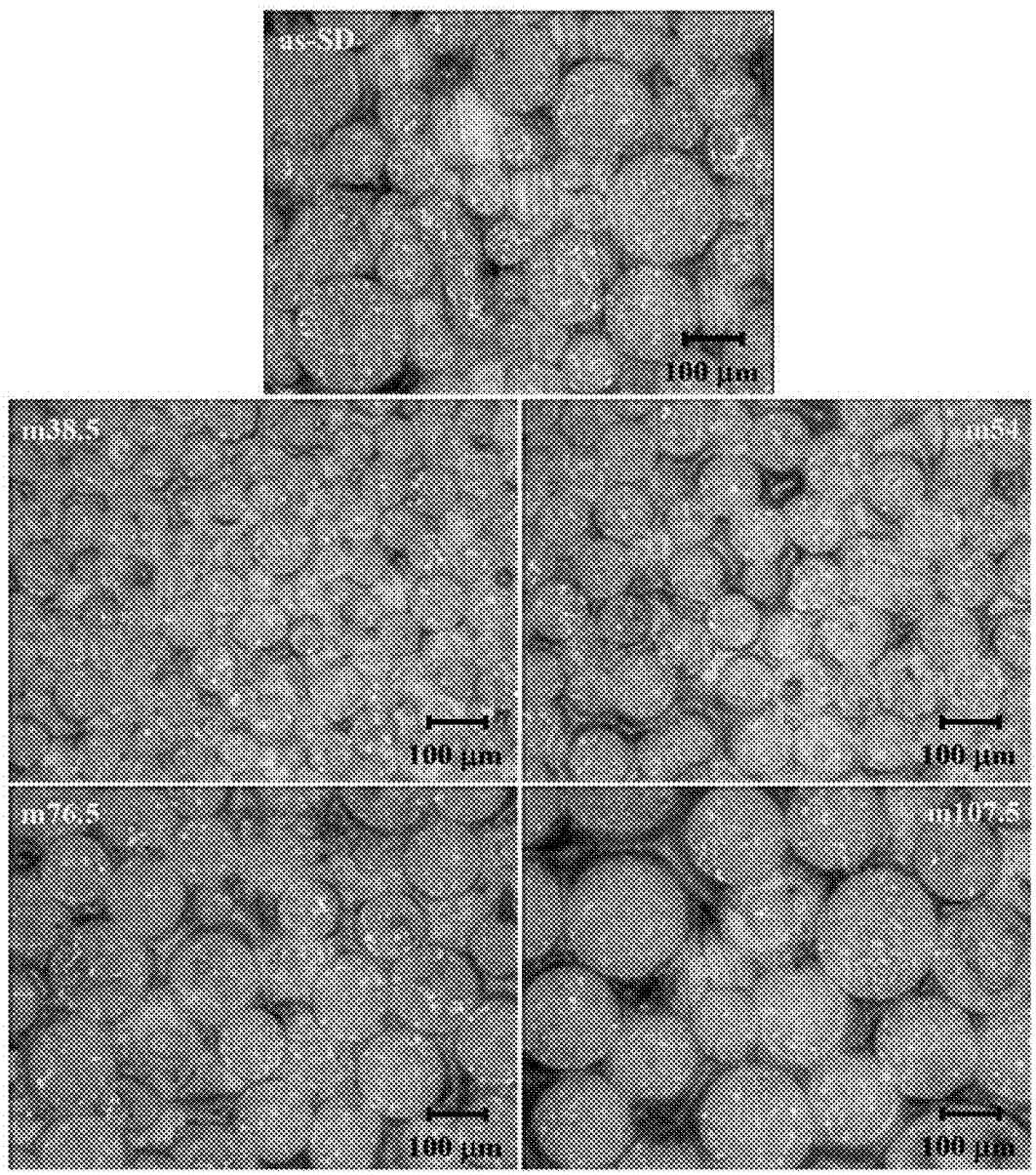
FIG. 9 is of optical micrographs showing the polished surface of SD5-SRBSN after resin impregnation, according to an embodiment of the present invention.

In order to directly observe the coarse pore channels formed between spherical granules of SD5-SRBSN, SRBSN was impregnated with resin and the polished surface thereof was observed using an optical microscope. The results are shown in FIG. 9. From FIG. 9, almost all of the granules can be seen to maintain the spherical shape obtained shortly after spray drying, in which dot contacts are prevalently formed between the granules and thus continuous pore channels are developed in proportion to the granule size. The white contrast in the granules indicates the resin portion incorporated into the pores in the granules. According to the present invention, because of the formation of not only coarse pore channels between the granules but also fine pore channels in the granules, the specific surface area of the pores may be enlarged, thereby increasing the performance of capturing nano particles.

FIG. 10 is a graph showing results of XRD of SD5-SRBSN, from which only the $\beta$-Si$_3$N$_4$ peaks (represented by □) can be observed due to complete phase conversion, without detection of $\alpha$-Si$_3$N$_4$ and other second phases.

Figure 11:
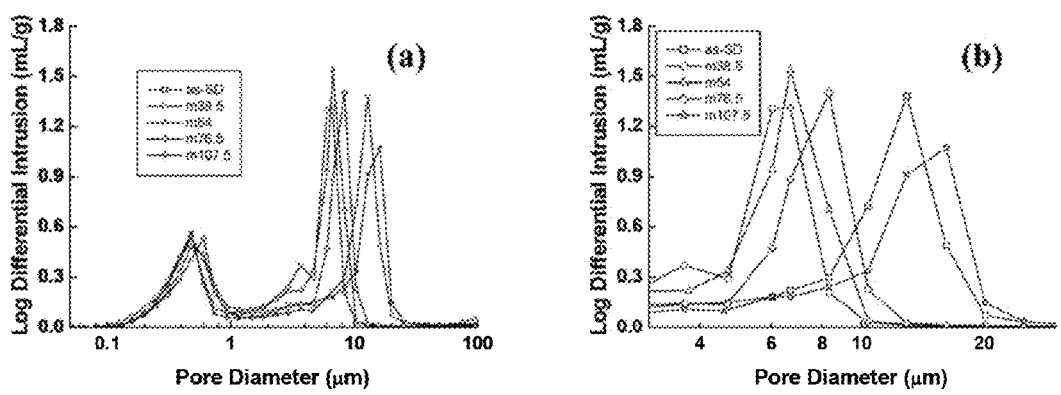
FIGS. 11A and 11B are graphs showing the size distribution of pore channels of SD5-SRBSN using mercury porosimetry according to an embodiment of the present invention.
Figure 12:
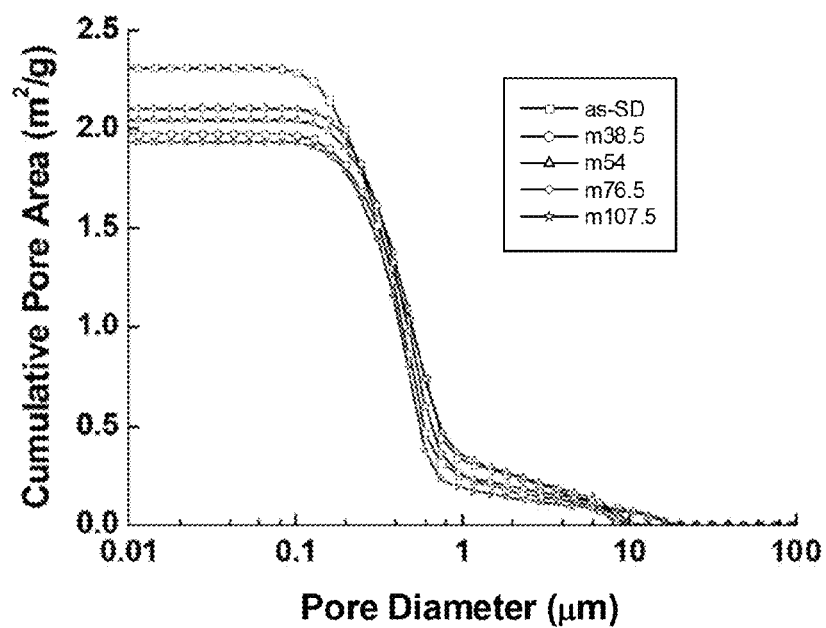
FIG. 12 is a graph showing cumulative specific surface area of SD5-SRBSN depending on the particle size according to an embodiment of the present invention.

FIGS. 11A and 11B are graphs showing the pore channel size distributions of SD5-SRBSN using mercury porosimetry, and FIG. 12 is a graph showing the specific surface area. In the present test, the mercury porosimeter used was Autopore IV 9510 available from Micromeritics, and measurement conditions were an equilibration time 10 sec, and the stem volume used 25% or more.

With reference to FIGS. 11A and 11B, the size of the pore channels of all the specimens can be seen to show a bimodal distribution including peaks based on fine pores equal to or smaller than 1 μm and peaks based on coarse pores ranging from 1 μm to about 10 μm. More specifically, in the case of fine pores, the maximum peak is observed in the range of 0.1~1 μm, and the maximum peak of the coarse pores is observed in the range of 1~20 μm.

Because fine pores are formed in the granules, they are not dependant on the granule size and have a similar size in all the specimens. However, the size of coarse pore channels has a tendency to depend on the granule size, and unsorted raw granules (as-SD) show the second largest pore size.

Whereas comparatively coarse particles are captured by an impact mechanism depending on the size and weight, fine nano particles are captured by a diffusion mechanism due to Brownian movement. Thus, as the specific surface area of the pores of the porous ceramic increases, the efficiency of capturing nano particles is raised. As shown in FIG. 12, the specific surface area of the porous sintered reaction-bonded silicon nitride ceramic made from granular Si mixture powder according to the present invention is about 1.9~2.3 m$^2$/g which is about 10 times larger than about 0.2 m$^2$/g which is the specific surface area of a SiC filter mounted to a commercially available diesel particulate filter (DPF), and is thus expected to exhibit high efficiency of capturing nano particles. On the other hand, the specific surface area of the coarse pores between the granules is 0.5 m$^2$/g or less in all the specimens as shown in the graph, from which the specific surface area of the fine pores in the granules can be seen to be extremely large. As is apparent from the graph, the granule size-specific surface area relation has a tendency of being the opposite of the granule size-coarse pore channel size relation. Specifically, the smallest specific surface area was measured in the specimen composed of the largest granules (m107.5). In particular, the largest specific surface area was measured in the specimen composed of the unsorted raw granules (as-SD). This is because the raw granules without being subjected to sorting using sieving include a plurality of granules smaller than the smallest m38.5 granules used in the present test.

Figure 13:
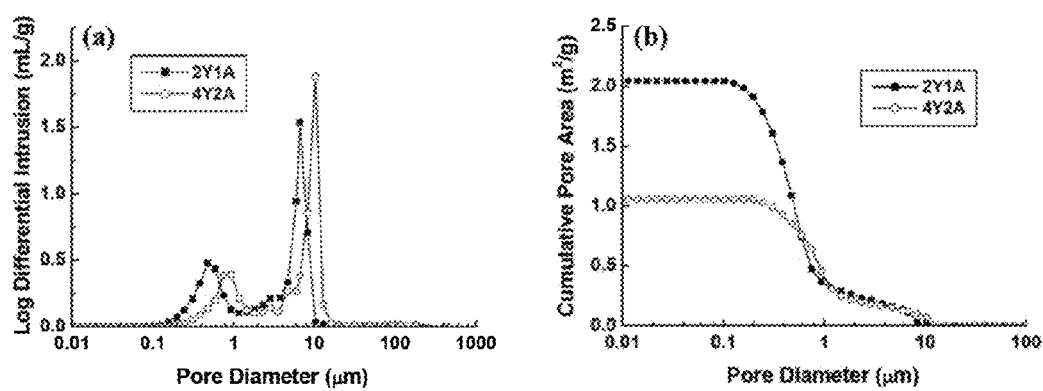
FIGS. 13A and 13B are graphs showing the results of mercury porosimetry of SD5-SRBSN and SD51-SRBSN according to an embodiment of the present invention.

FIGS. 13A and 13B are graphs showing the results of mercury porosimetry of SD5-SRBSN and SD51-SRBSN. Whereas SD51-SRBSN including a large amount of sintering additive has a large pore channel size, the specific surface area of pores is seen to be greater in SD5-SRBSN including a small amount of sintering additive. Thereby, it appears that the pore structure of a liquid sintered system is dominated by the absolute amount of produced liquid. When the graph is strictly analyzed, both the coarse pore channels (~10 μm) between the granules and the fine pore channels (<1 μm) in the granules are larger for SD51 than for SD5. Compared to SD5 composed of isotropic particles, SD51 composed of acicular particles has a smaller specific surface area of pores. This is because the morphology of the particles is changed and the particles actively grow owing to the increased amount of liquid. Even in this case, however, the specific surface area of pores is measured to be about 1.0 m$^2$/g and is regarded as larger compared to a commercially available SiC filter composed of coarse isotropic particles.

Figure 14:
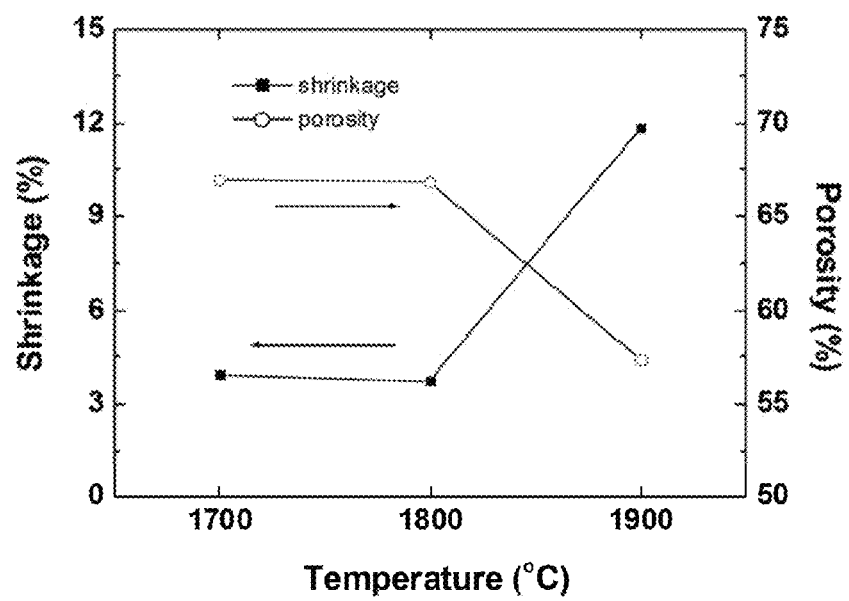
FIG. 14 is a graph showing the shrinkage and porosity behavior of SD51-SRBSN depending on the sintering temperature according to an embodiment of the present invention.

In order to evaluate the optimal sintering conditions of SD51 granules depending on the sintering temperature, specimens were manufactured at different sintering temperatures of 1700° C., 1800° C. and 1900° C. and the properties thereof were measured. The results are shown in FIG. 14. Although shrinkage and porosity upon sintering at 1700° C. were similar to shrinkage and porosity upon sintering at 1800° C., the porosity was remarkably decreased due to drastic shrinkage upon sintering at 1900° C. In particular, although the weight loss upon sintering at 1800° C. or lower is approximately zero, sintering at 1900° C. is accompanied by the weight loss of about 10% due to the decomposition of silicon nitride despite a nitrogen pressure atmosphere of 0.9 MPa, undesirably weakening the strength of the sintered ceramic.

Figure 15:
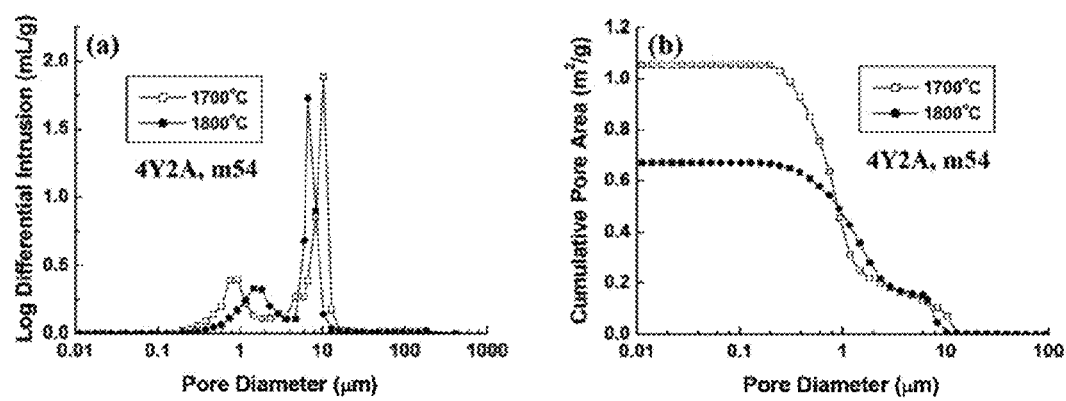
FIGS. 15A and 15B are graphs showing the cumulative specific surface area change of SD51-SRBSN depending on the pore distribution and the pore size at different sintering temperatures according to an embodiment of the present invention.

Among SD51 specimens, pore structures of the porous sintered ceramics at 1700° C. and 1800° C., but not for the ceramic sintered at 1900° C. which has a strength and shrinkage unsuitable for a filter, were analyzed. The results are FIGS. 15A and 15B. As shown in FIGS. 15A and 15B, the coarse pore channel sizes are similar in the above two sintered ceramics having similar porosity and shrinkage, but the fine pore channels have grown to 1 µm or less in the sintered ceramic at 1700° C. but have grown to 1 µm or more in the sintered ceramic at 1800° C. The specific surface area of pores was measured to be large in the sintered ceramic at 1700° C. the fine pore size of which is comparatively small.

As is apparent from the above embodiment, the sintered ceramic having a pore structure in which both coarse pores and fine pores are formed can be manufactured from the granular powder according to the present invention.

Figure 16:
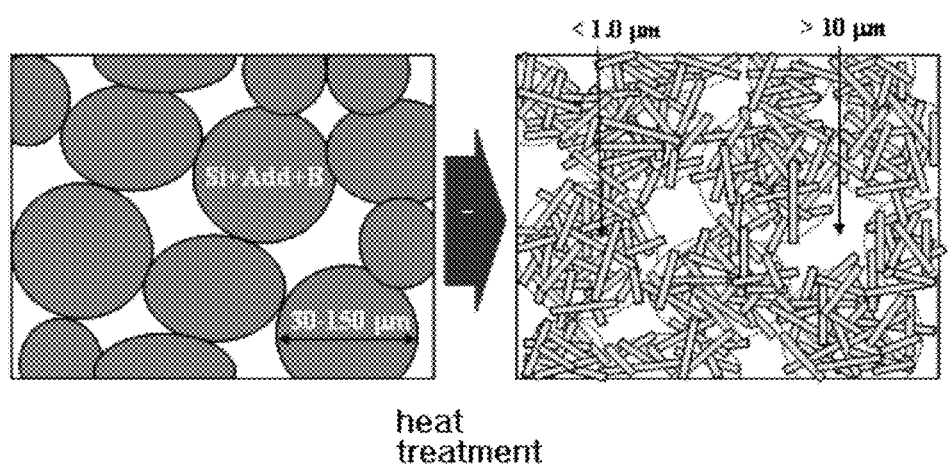
FIG. 16 is a schematic view showing the pore structure of the porous sintered ceramic according to the present invention.

FIG. 16 schematically depicts the pore structure of the porous sintered ceramic according to the present invention. As shown in the left drawing, when the granular powder according to the present invention is subjected to pressureless compacting, coarse pores having a predetermined size are formed between the pre-sintered powder particles. These pores are connected between the layered powder particles, thus forming pore channels.

Then, when the granular Si powder compact is nitrided and post-sintered, the sintering additive contained in the material powder forms a liquid phase in the course of heating and the formed liquid phase remains in the fine pores in the granular powder because of the capillary principle, and thus aids the intragranular sintering but does not pact the coarse pores. As a result, as shown in the right drawing, the microstructure in which the granules having fine pores therein are arranged through dot contacts may be obtained. This microstructure is advantageous because the sintered granules constitute almost the same shape as the shape of the compact and coarse pore channels are formed between the granules.

The size of such coarse pores is dependent on the size of the granular powder. For example, assuming that pre-sintered granules have the same size and are layered in a very dense structure, the minimum size of coarse pores is theoretically determined to be about 0.077*D (D is the diameter of a powder), and the pore diameter calculated from an equivalent area is about 0.23*D. As mentioned in the embodiment, in the case where the granules have a size of 30~150 µm, coarse pore channels of at least 1 µm or at least 10 µm may be ensured, and, in the granules, as silicon nitride is produced through nitridation and then sintered, fine pore channels of less than 1 µm may be formed.

Therefore, the Si granular powder according to the present invention may provide porous sintered reaction-bonded silicon nitride ceramics having a microstructure in which both coarse pores and fine pores are formed through nitridation and post-sintering.

C. Manufacture of Porous Sintered Reaction-Bonded Silicon Nitride Ceramics from Pre-Sintered Granules (1) Preparation of Pre-Sintered Granular Powder Typically, the strength of granules resulting from a spray drying process is weak on the order of 0.5 MPa or less. Hence, when a pressing process is applied, granules are broken in a typical pressing pressure range, thus making it impossible to maintain the spherical shape.

In the present invention, the Si granular powder obtained per the above was pre-sintered, thus manufacturing pre-sintered granular powder able to ensure compacting strength.

The pre-sintering process of enhancing the strength of Si mixture powder granules may take into consideration the following two items. First, heating is performed at a temperature equal to or higher than a eutectic liquid temperature in an inert (albeit non-nitrogen) atmosphere able to prevent the oxidation of material powder, thereby inducing the intragranular sintering through liquid phase sintering. Second, thermal treatment is performed in a nitrogen atmosphere thereby inducing the nitridation, so that the strength in the granules may be enhanced. In the above two pre-sintering treatments, undesired intergranular sintering may take place along with desired intragranular sintering, and thus there may occur a case where it is difficult to maintain the spherical shape of granules after grinding. Hence, the process conditions such as temperature, time and atmosphere should be controlled.

The granular powder used in the present embodiment includes sorted granules having the mean granule size of 38.5 µm (32~45 µm, referred to as "m38.5"), 54 µm (m54), 76.5 µm (m76.5) and 107.5 µm (m107.5) through sieving, and unsieved granules (as-SD) of all sizes.

(a) Pre-Sintering Via Nitridation

The granules including high-melting-point YA (SD4; $Y_2O_3$:$Al_2O_3$=2:1) were pre-sintered through nitridation under conditions of 1300° C.-6 h. Because the eutectic liquid temperature of the same type is 1370° C., heating to 1370° C. or higher is required to induce pre-sintering via liquid phase sintering. However, because the above high temperature is very approximate to the melting point (1412° C.) of the main material Si, stable process control is considered to be difficult, and thus, a nitridation mechanism performed at a temperature equal to or lower than the eutectic liquid temperature was adopted. The nitridation conditions are set to induce the nitridation at a medium level so as to facilitate the separation of granules by grinding after pre-sintering. Taking measurements showed that the nitridation rate of 65.6% was obtained.

Figure 17:
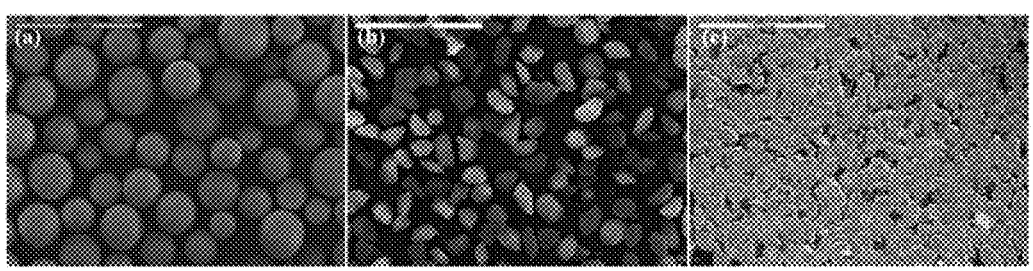
FIG. 17A is a photograph showing the shape of raw granules before pre-sintering.
FIG. 17B is a photograph showing the shape of granules after pre-sintering and grinding.
FIG. 17C is a photograph showing the polished cross-section of granules having been subjected to isostatic pressing at a pressure of 100 MPa after pre-sintering and grinding.

However, not only intragranular sintering but also intergranular sintering were carried out by virtue of the pre-sintering process using nitridation, and most spherical granules were observed to be broken into the angular shape by grinding. FIG. 17A shows the granules before pre-sintering, and FIG. 17B shows the granules after pre-sintering and grinding. Also, the ground and pre-sintered granules were subjected to isostatic pressing at a pressure of 100 MPa, and the cross-section thereof was polished and observed. The results are shown in FIG. 17C. As can be seen in FIG. 17C, granules having a spherical shape are partially observed, from which the shape of the granules resulting from such pre-sintering can be confirmed to be maintained despite the subsequent pressing at high pressure.

(b) Pre-Sintering in Inert Atmosphere

In the present invention, pre-sintering was performed in an inert atmosphere so that intergranular sintering did not occur via nitridation upon pre-sintering of granular powder. The pre-sintering temperature was set to be equal to or lower than the melting point of Si.

The low-melting-point type composition may be pre-sintered via liquid phase sintering at a comparatively low temperature, thus facilitating the separation of granules. Hence, even after pre-sintering, the pre-sintered granular powder the spherical shape of which is maintained is considered to be obtained. For example, because the eutectic liquid temperature of the YAC type composition is 1170° C. which is different from the melting point (1412° C.) of Si, when thermal treatment is carried out in an inert gas atmosphere such as Ar at a temperature equal to or higher than the eutectic liquid temperature, the nitridation is excluded, so that the intergranular sintering insignificantly occurs and liquid phase sintering is carried out in the granules by virtue of the sintering additive.

The YAC type sintering additive used in the present embodiment is shown in Table 4 below, in which $Y_2O_3$:$Al_2O_3$=2:1 by weight ratio is maintained and the amount of CaO is set to maintain the proportional relation of $Al_2O_3$ and CaO corresponding to the process liquid composition in the ternary $Al_2O_3$—$SiO_2$—CaO phase system (Table 4).

TABLE 4

|  | Si | $Y_2O_3$ | $Al_2O_3$ | CaO | PAA | Unit: g PVA |
|---|---|---|---|---|---|---|
| SD6 | 100 | 2.67 | 1.33 | 1.15 | 0.53 | 2.12 |

To find suitable pre-sintering conditions, thermal treatment was performed for 10 min using a tube furnace in an Ar atmosphere at 1200° C., 1300° C. and 1350° C. equal to or higher than the eutectic liquid temperature (PG1, PG3, PG4, respectively). Furthermore, 60 min treatment at 1200° C. was performed (PG2).

Figure 22:
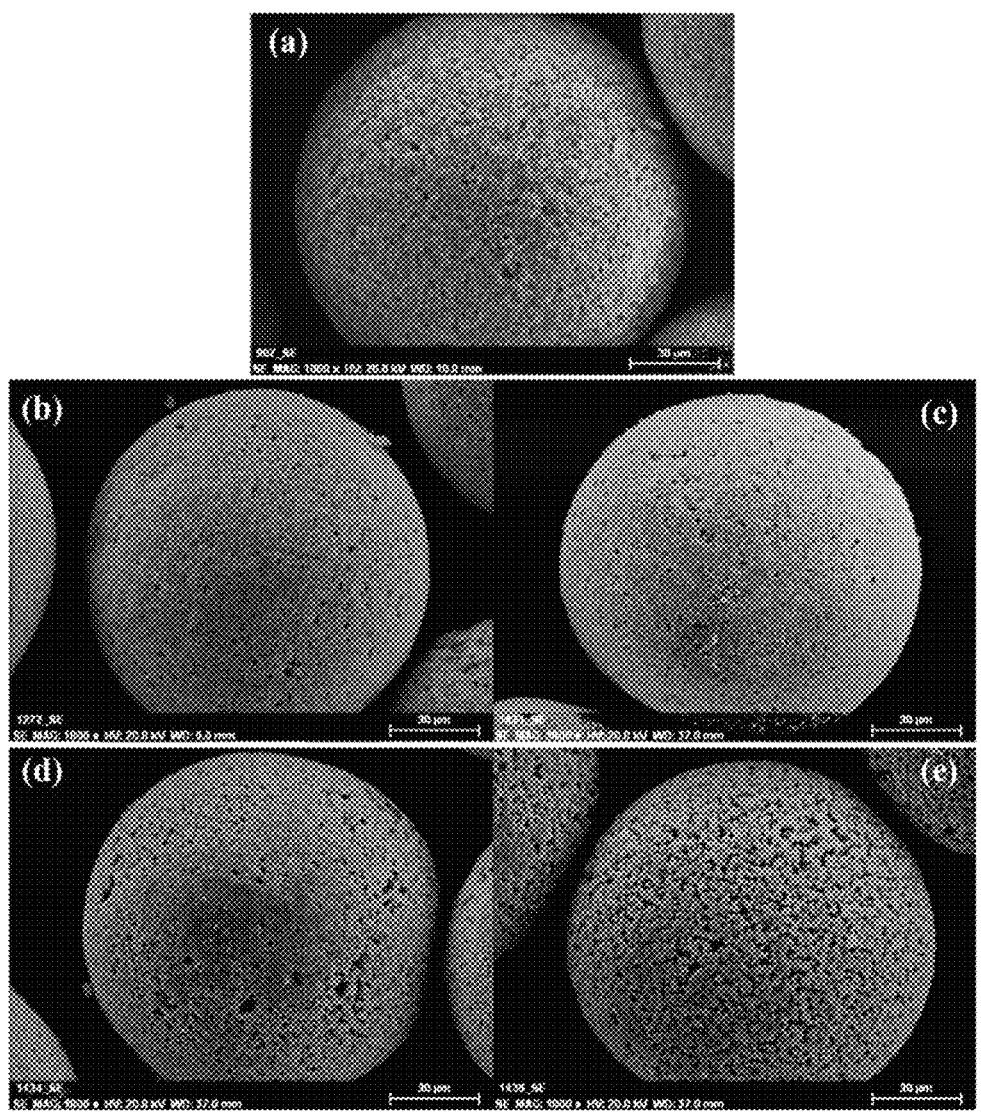
FIGS. 22A to 22E are scanning electron micrographs showing raw granules and pre-sintered granules according to an embodiment of the present invention.

FIG. 22 shows the microstructures of surfaces of raw granules and pre-sintered granules. In the case of the granules pre-sintered at 1200° C. (for 10 min in FIG. 22B, and for 60 min in FIG. 22C), the pores between the particles are observed to be filled with the amorphous liquid produced between the particles, thus decreasing the surface roughness. Furthermore, when the pre-sintering temperature was increased to 1300° C. (FIG. 22D) and 1350° C. (FIG. 22E), the particles were actively integrated by the progress of liquid phase sintering, so that particle agglomerates are clearly discerned from each other. As results of phase analysis using XRD, h-phase ($Y_5Si_3O_{12}N$) was detected under all the pre-sintering temperature conditions, which indicates that liquid is interposed.

The powder flowability before and after pre-sintering was measured according to JIS Z 2502-1979. The flowability was compared by drying about 5 g of granules in an oven at 105° C. for 1 hour to be dewatered, cooling the dried granules to room temperature in a desiccator, and measuring the time required to pass such granules through an orifice having a diameter of 0.1" (2.54 mm). As such, the flowability of the pre-sintered granules was measured in a state of any grinding process not being performed after pre-sintering.

In the case of sorted m107.5, the flowability values of raw granules (as-SD), 1200° C.-10 min pre-sintered granules (PG1) and 1350° C.-10 min pre-sintered granules (PG4) were measured to be 0.4136 g/sec, 0.4068 g/sec, and 0.3180 g/sec, respectively. From this, the flowability of the pre-sintered granules can be seen to be similar to that of the raw granules. This is because intergranular sintering is inhibited in the course of pre-sintering, thus obtaining powder for which the separation of granules is easy. The reason why the flowability of PG4 is slightly reduced is considered to be due to an increase in surface roughness by the agglomeration of particles as shown in FIG. 22E.

According to the method of the present invention, intergranular sintering is inhibited and thus powder for which the separation of the granules is easy may be obtained.

The properties of the resultant pre-sintered granular powder compact are described below.

(2) Pressing Behavior of Pre-Sintered Granular Powder

Figure 18:
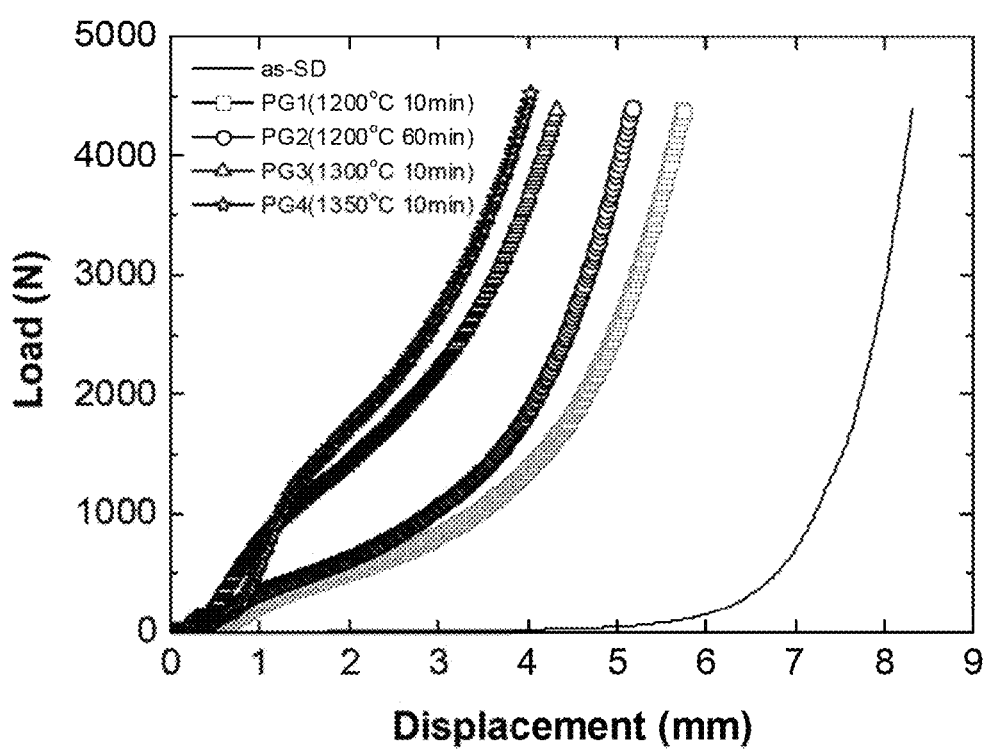
FIG. 18 is a graph showing the load-displacement relation of granules according to the present invention.
Figure 19:
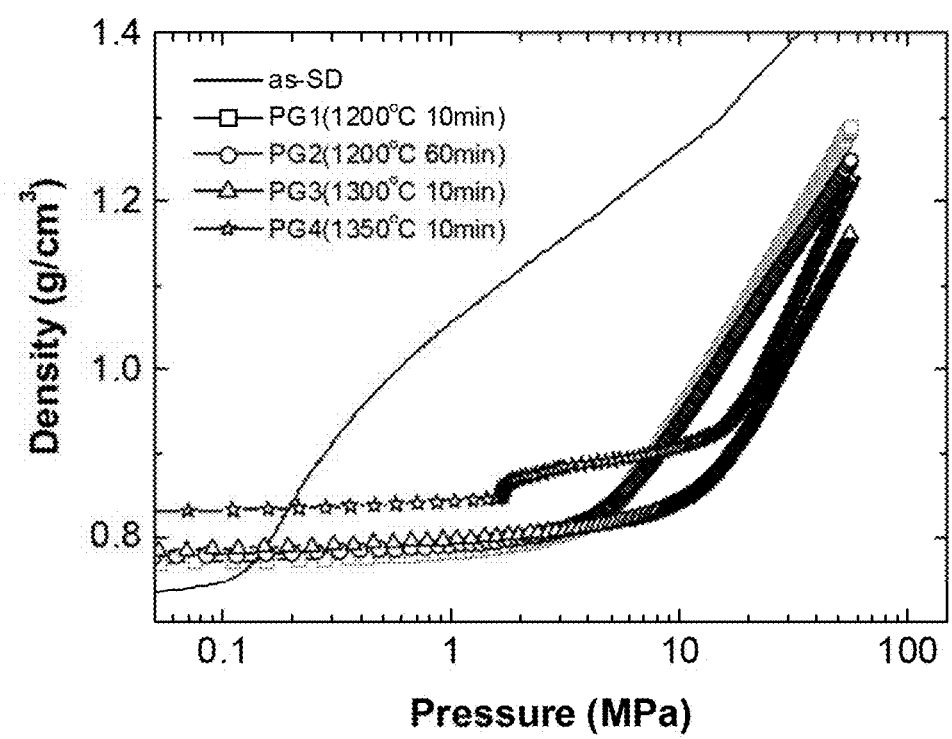
FIG. 19 is a graph showing the pressing density-pressing pressure relation of the granules according to the present invention.

In order to evaluate the strength of raw granules and pre-sintered granules, a cylinder mold having a diameter of 10 mm was packed with the granules under their own weight, and the load-displacement relation was determined under displacement-controlled loading (0.5 mm/min) (FIG. 18), and the weight of the granules used in the test was substituted thereto, thus determining the pressing density-pressing pressure relation (FIG. 19).

The drastic increase in the load at a predetermined displacement or more is based on the increase in the pressing density after breaking the granules, and thus the gradual load increase and the large displacement observed in the previous step are known to be caused by the flow and deformation of granules. In FIG. 18, the displacement size of raw granules observed under a weak load until before the load is drastically increased is remarkably larger than that of the pre-sintered granules, which coincides with typically known pressing behavior. FIG. 18 shows the load-displacement curves depending on the pre-sintering conditions. Pre-sintering for 10 min at 1200° C., 1300° C. and 1350° C. resulted in steeper load-displacement curves because the degree of liquid phase sintering increased in proportion to the increase in the sintering temperature. Furthermore, similar behavior is manifested at different sintering time periods at 1200° C., which indicates that the load-displacement curve is more greatly affected by the sintering temperature than by the sintering time.

In FIG. 19, the pressure at the inflection point indicates the yield strength at which the granules begin to break, and this inflection point starts to drastically increase the density. In FIG. 19, the yield strength of raw granules is 0.2 MPa or less, the yield strength of 1200° C. pre-sintered granules is about 5~6 MPa, the yield strength of 1300° C. pre-sintered granules is about 10 MPa, and the yield strength of 1350° C. pre-sintered granules is about 20 MPa. The strength is estimated to be enhanced by about 25~100 times of as-spray dried weak granules by pre-sintering. Though additionally shown in the present embodiment, when a sample having 3 wt % or more of a sintering additive is used, the yield strength is estimated to be higher than the above values.

In order to compare the sphere stability of the pre-sintered granules after pressing, the raw granules and the pre-sintered granules were uniaxially pressed and then impregnated with resin, after the polished surface thereof was observed using an SEM. The 1200° C.-10 min pre-sintered granules (PG1) were taken. Because the yield strength of the granules was measured to be about 5~6 MPa as shown in FIG. 19, four uniaxial pressing pressure values, for example, 3.7 MPa and 7.5 MPa at which the spherical shape of granules is considered to be stable, and 18.6 MPa and 46.6 MPa at which the granules may be deformed or broken, were selected.

Figure 20:
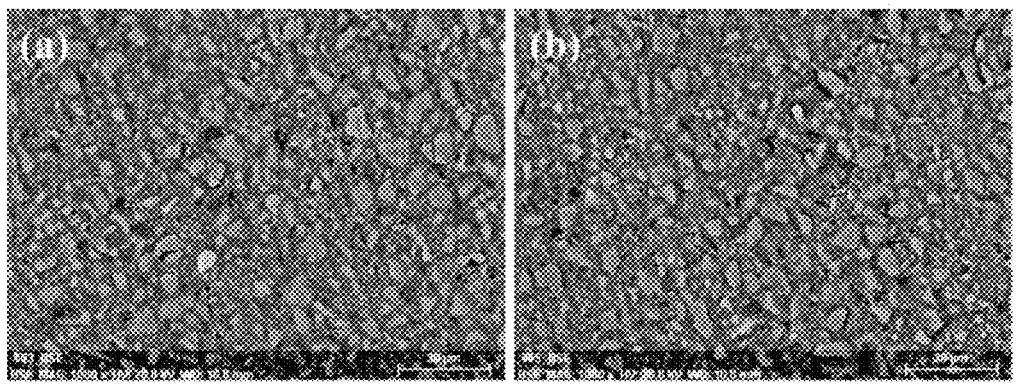
FIGS. 20A and 20B are photographs showing the cross-section of raw granules uniaxially pressed at 3.7 MPa and 18.6 MPa according to the present invention.
Figure 21:
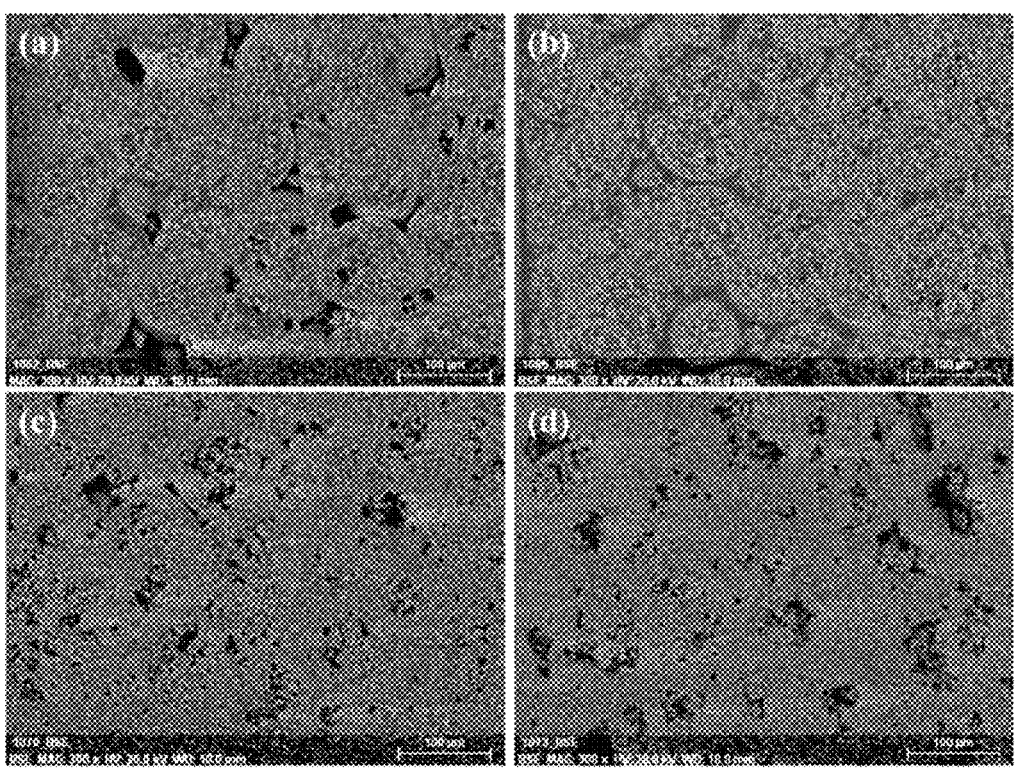
FIGS. 21A to 21D are photographs showing the cross-section of pre-sintered granules uniaxially pressed at 3.7 MPa, 7.5 MPa, 18.6 MPa and 46.6 MPa according to the present invention.

Observation of the polished surfaces revealed that the spherical shape of the raw granules were completely broken at 3.7 MPa (FIG. 20A) and 18.6 MPa (FIG. 20B), whereas the spherical shape of the pre-sintered granules was completely maintained at a pressure equal to or lower than 7.5 MPa (FIGS. 21A and 21B) and was deformed or broken at a pressure equal to or higher than 18.6 MPa (FIGS. 21C and 21D). Typically, because uniaxial pressing is carried out at about 5 MPa and extrusion is performed at about 8 MPa, the pre-sintered granules according to the present invention are considered to have enough strength to be applied to a compacting process useful on industrial sites.

(3) Production of Compact of Pre-Sintered Granules for Reaction Bonding

As described in the above embodiment, a compact having a pore structure in which both coarse pores and fine pores are formed together may be manufactured from the granular powder according to the present invention.

When the pre-sintered granular powder according to the present invention is subjected to uniaxial pressing, extrusion or injection molding, coarse pores having a predetermined size are formed between the pre-sintered powder particles. These pores are connected between the layered powder particles, thus forming pore channels (FIG. 16).

When such a Si granular powder compact is subjected to nitridation and post-sintering, the sintering additive contained in the material powder forms a liquid phase during the heating process and the produced liquid phase remains in the fine pores in the granules because of the capillary principle thus aiding the intragranualr sintering but not packing the coarse pores. As a result, as shown in the right drawing of FIG. 16, the microstructure having coarse pores of almost the same size as the shape of the compact may be obtained.

Ultimately, the size of the coarse pores is dependent on the size of the pre-sintered granules. For example, assuming that pre-sintered granules have the same size and are layered in a very dense structure, the minimum size of the coarse pores is theoretically determined to be about 0.077*D (D is the diameter of a powder), and the pore diameter calculated from an equivalent area is about 0.23*D. However, because the pore size is larger at typical low pressing pressures, in the case where the size of the granules is in the range of 30~150 μm, pore channels having coarse pores equal to or more than 1~10 μm may be ensured. On the other hand, in the granules, as silicon nitride is produced through nitridation and post-sintering, fine pore channels of less than 1 μm may be formed.

Thus, the Si granular powder according to the present invention may be subjected to reaction-bonding and post-sintering, thereby manufacturing porous sintered reaction-bonded silicon nitride ceramics having a microstructure in which both coarse pores and fine pores are formed together.

(4) Post-Sintering of Compact

Among the pre-sintered granules of SD6 including YAC, PG1 (1200° C.-10 min pre-sintered) was added with an appropriate amount of 5% PVA solution, uniaxially pressed at a pressure of 3.7 MPa equal to or lower than the yield strength of the granules, and then dried in an oven at 105° C. for 24 hours so as to be dewatered.

The dried specimen was nitrided in a flowing nitrogen atmosphere including hydrogen and post-sintered in a static nitrogen atmosphere of 0.1~0.9 MPa, thus manufacturing a porous ceramic.

Figure 23:
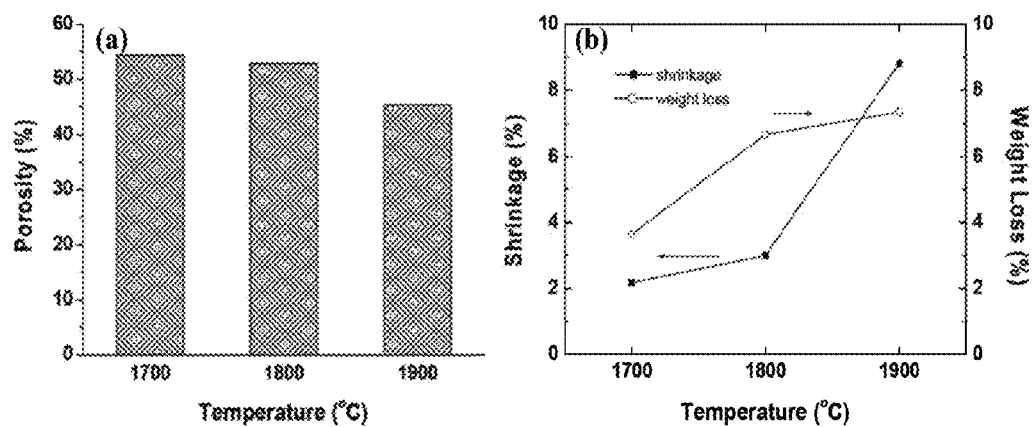
FIGS. 23A and 23B are graphs showing the porosity, shrinkage and weight loss of a uniaxially pressed compact of m76.5 pre-sintered granules depending on the post-sintering temperature according to the present invention.

In order to determine the optimal post-sintering temperature, the porosity, shrinkage and weight loss of the uniaxially pressed compact of m76.5 pre-sintered granules were measured depending on the post-sintering temperature. The results are shown in FIGS. 23A and 23B. Because of the increase in the shrinkage in proportion to the sintering temperature, the porosity was reduced, and the weight loss of about 7% was measured upon sintering at 1800° C. or higher despite the nitrogen pressure atmosphere.

Figure 24:
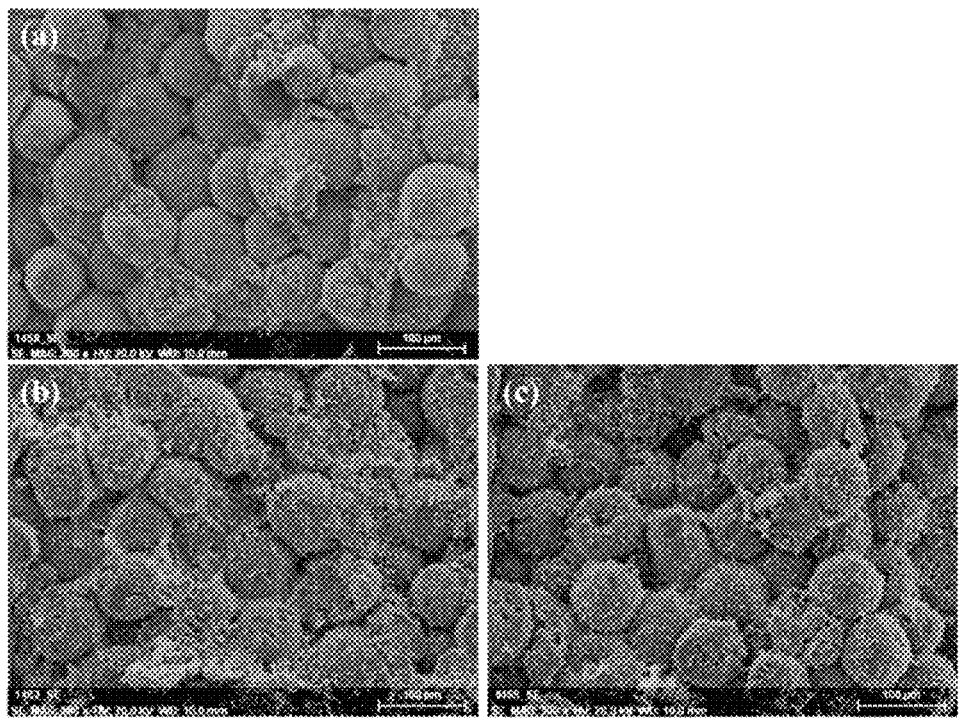
FIGS. 24A to 24C are low-magnification (×300) photographs showing the fracture surface of the post-sintered specimens of m76.5 pre-sintered granules at 1700° C., 1800° C. and 1900° C. according to the present invention.

FIGS. 24A, 24B and 24C are low-magnification (×300) photographs showing the fracture surface of the post-sintered specimens at 1700° C., 1800° C. and 1900° C. using m76.5 pre-sintered granules. When sintering is performed at 1800° C. or higher (FIGS. 24B and 24C), the silicon nitride particles grown in a whisker phase are obviously observed in the void space between the granules compared to when sintering is performed at 1700° C. (FIG. 24A).

Figure 25:
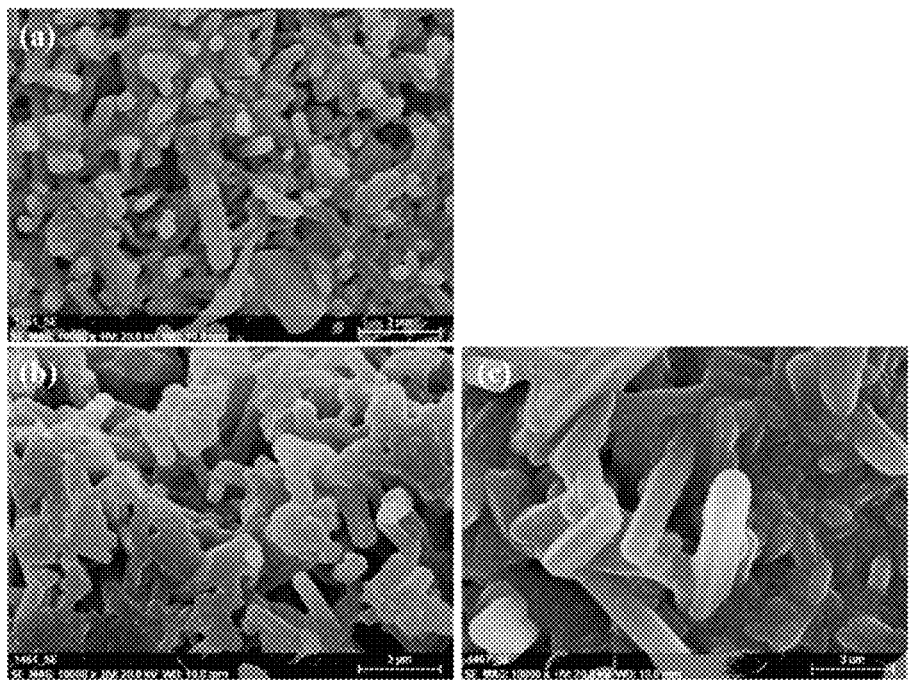
FIGS. 25A to 25C are high-magnification (×10 k) photographs showing the inside of the granules of respective specimens of FIGS. 24A to 24C.

FIGS. 25A, 25B and 25C are high-magnification (×10 k) photographs showing the inside of the granules of respective specimens of FIGS. 24A, 24B and 24C. The microstructure in which intrinsic acicular morphology of silicon nitride particles has been considerably developed is seen in all of the specimens.

Figure 26:
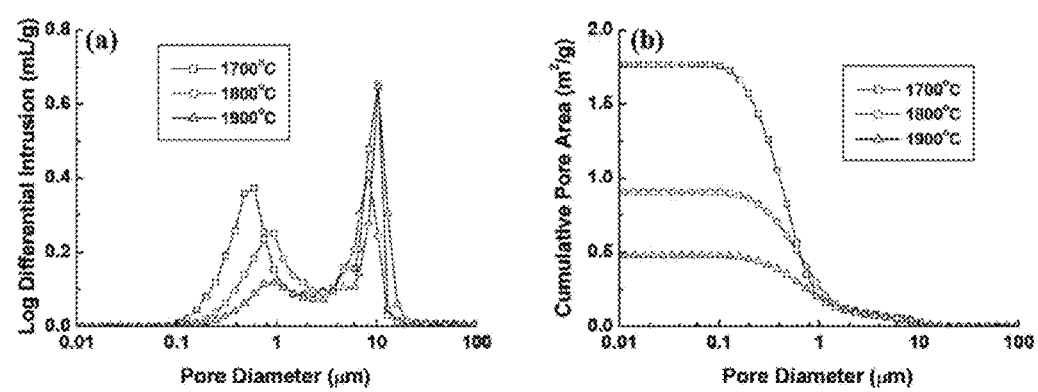
FIGS. 26A and 26B are graphs showing the pore distribution and the specific pore surface area of the post-sintered specimens of FIGS. 24A to 24C using mercury porosimetry.

FIGS. 26A and 26B are graphs showing the pore distribution and the pore specific surface area of the above porous post-sintered ceramics as measured using mercury porosimetry. As the sintering temperature increases, the frequency of fine pores is reduced and the size thereof increases, whereas the size of the coarse pores is maintained at almost the same level. Typically, because liquid phase sintering increases the amount of liquid and decreases the viscosity thereof at higher temperature, it is known to facilitate the densification and growth of particles. Also in the present invention, the integration and growth of the particles and the growth of the pores are simultaneously generated in the granules, and thus the size of fine pores is estimated to be increased.

As shown in FIG. 26B, the results of measuring the specific surface area of pores coincide with those of FIG. 14A. Specifically, in FIG. 26B, the specific surface areas defined by the coarse pores between the granules are similar regardless of the sintering temperature, but the specific surface area defined by fine pores in the granules is drastically reduced due to the integration of the pores in proportion to the increase in the sintering temperature.

Furthermore, the specific surface area of the post-sintered specimen at 1900° C. is remarkably reduced due to excessive shrinkage.

Figure 27:
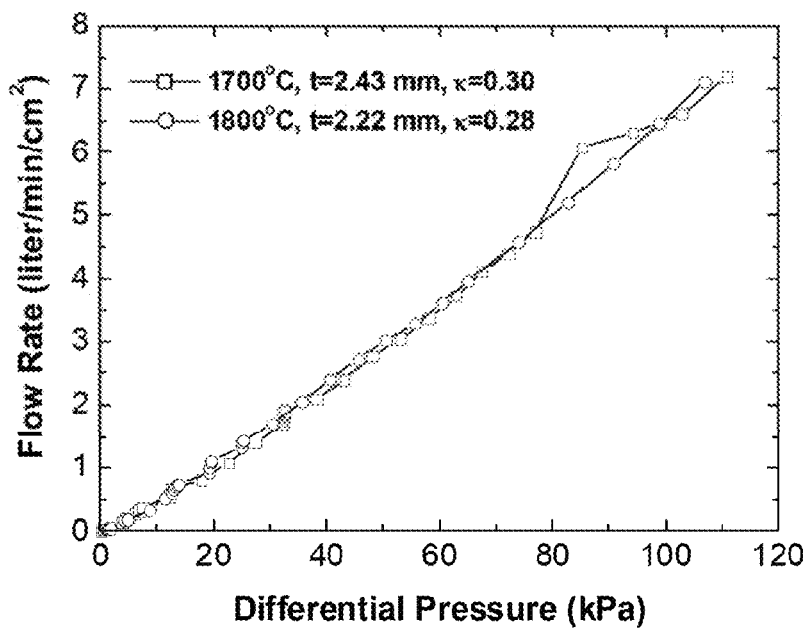
FIG. 27 is a graph showing air permeability of the sintered specimens at 1700° C. and 1800° C., among the post-sintered specimens of FIGS. 24A to 24C FIGS. 28A and 28B are graphs showing the porosity and shrinkage (weight loss) of the post-sintered specimens at different granule sizes using sorting according to the present invention.

FIG. 27 is a graph showing the air permeability of the above specimens sintered at 1700° C. and 1800° C. The measurement device was CFP-1200-AEL available from Porous Materials Inc. Measuring showed that two specimens resulting from different sintering temperatures were measured to have similar permeability constants ($k=0.28~0.30 \times 10^{12}$ m$^2$). This is thought to be because the size of coarse pore channels dominating the air permeability is constant regardless of the sintering temperature.

Figure 28:
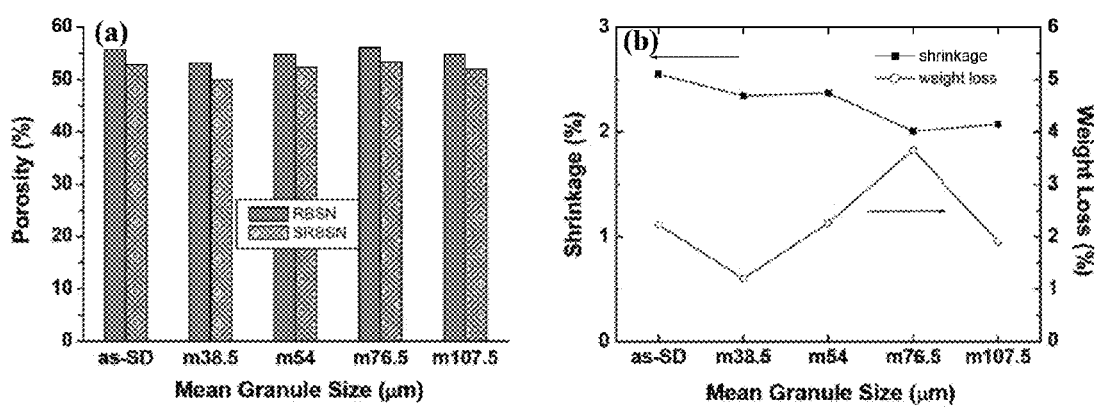

FIGS. 28A and 28B are graphs showing porosity and shrinkage (weight loss) of post-sintered specimens having different granule sizes, in which as-SD is unsorted pre-sintered granules, and post-sintered specimens, for example, m38.5, m54, m76.5 and m107.5 indicate the sorted granules having the mean size. The sintering temperature of these specimens was 1700° C. The porosity was measured to be similar regardless of the granule size, and was about 50% which was slightly reduced compared to that of the reaction-bonded silicon nitride (RBSN). This is estimated to be due to the shrinkage more than the weight loss effect.

Figure 29:
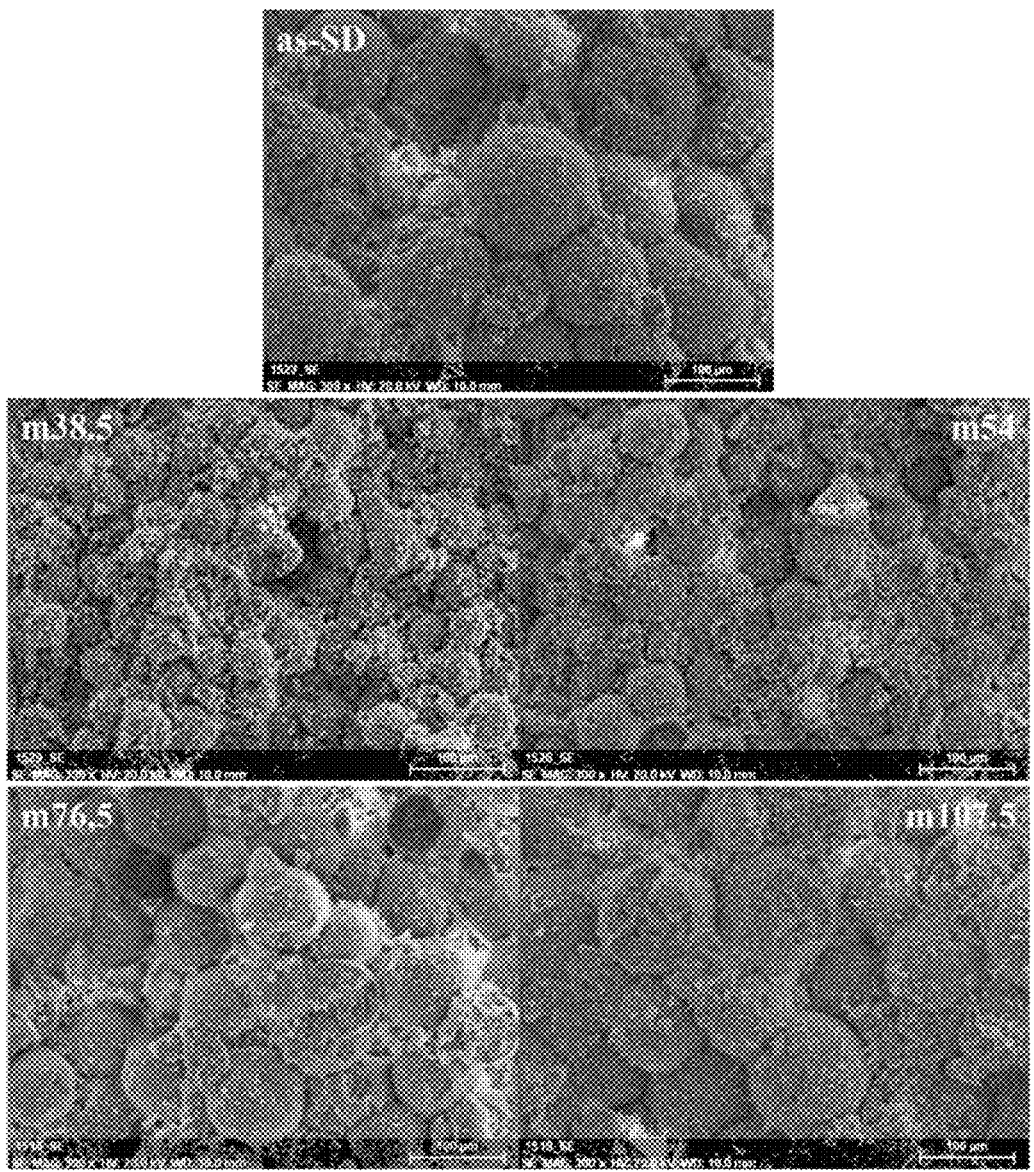
FIG. 29 is of photographs showing the fracture surface of the post-sintered specimens of FIGS. 28A and 28B at different granule sizes.

FIG. 29 is of photographs showing the fracture surfaces of respective post-sintered specimens of FIGS. 28A and 28B at different granule sizes. The m38.5 and m54 specimens having the small granule size show that the pore channels between the granules are blocked by the acicular silicon nitride particles. Thus, the air permeability of the uniaxially pressed porous ceramic having a small granule size is estimated to decrease.

Figure 30:
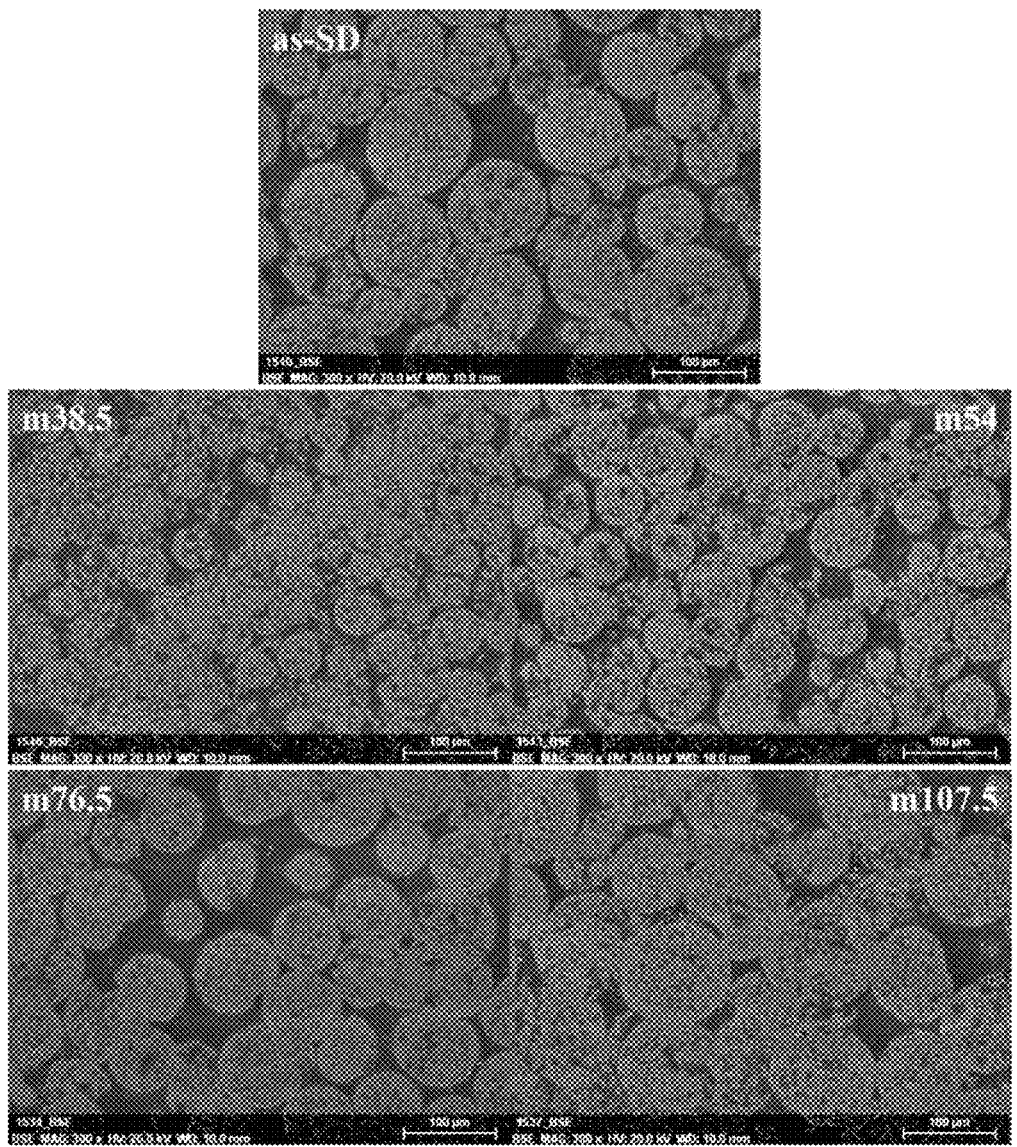
FIG. 30 is of photographs showing the polished surface of the post-sintered specimens of FIGS. 28A and 28B after resin impregnation.

FIG. 30 is of photographs showing the polished surfaces of respective post-sintered specimens of FIGS. 28A and 28B after resin impregnation. In the m38.5 specimen, unclear portions of boundaries between the granules are observed. This is considered to be because the channels between the granules are blocked by means of silicon nitride particles formed between the granules and the deformation of the granules due to uniaxial pressing pressure. When the granule size is increased as in the m76.5 and m107.5 specimens, such portions are not observed.

Figure 31:
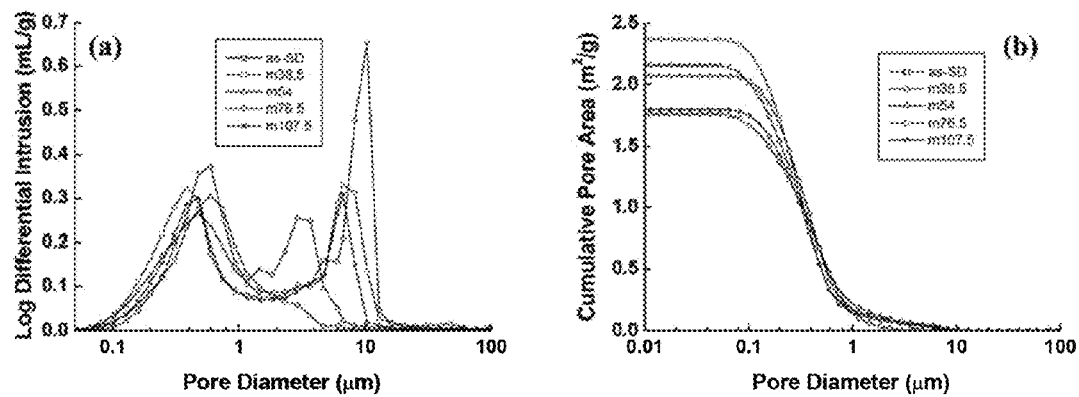
FIGS. 31A and 31B are graphs showing the results of mercury porosimetry of the post-sintered specimens of FIGS. 28A and 28B.

FIGS. 31A and 31B are graphs showing the results of mercury porosimetry of respective post-sintered specimens of FIGS. 28A and 28B. The graphs show a bimodal distribution in which peaks corresponding to fine pores of less than 1 µm and peaks corresponding to coarse pores of 1 µm or more are formed together. In the case of the m38.5 specimen having the smallest granule size, the peak corresponding to the coarse pore channels is not clearly observed, from which the channels are considered to be blocked by the reaction product and the deformation of granules. Not in the m107.5 specimen but in the m76.5 specimen, the maximum coarse pore channel size and volume fraction were measured. This is estimated to be because part of the coarse granules is broken upon uniaxial pressing of the m107.5 specimen, thus partially blocking the pores between the granules.

Figure 32:
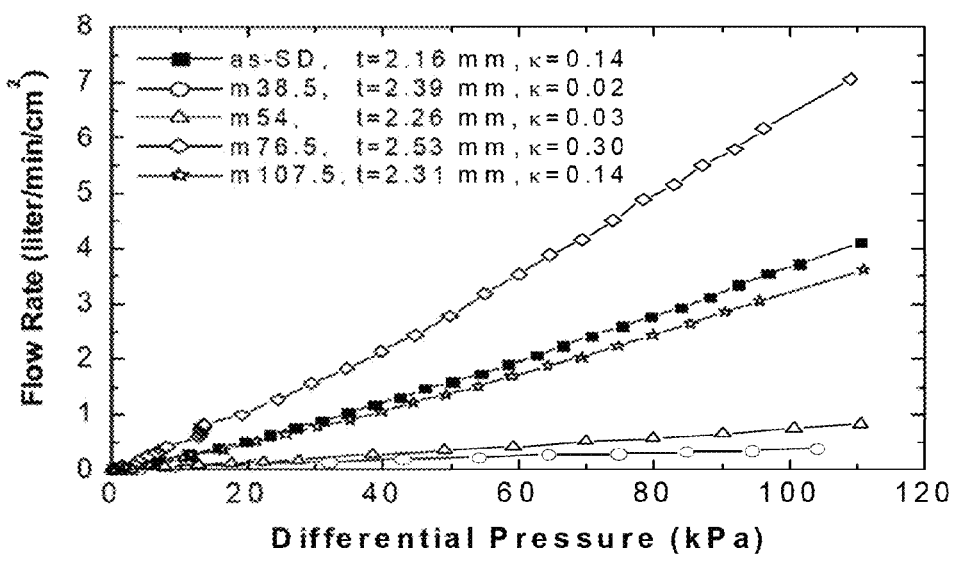
FIG. 32 is a graph showing the air permeability of the post-sintered specimens of FIGS. 28A and 28B.

FIG. 32 is a graph showing the air permeability of respective specimens. The m76.5 specimen exhibits the greatest air permeability. As the granule size decreases, air permeability can be seen to deteriorate.

The post-sintered reaction-bonded silicon nitride ceramic according to the present invention has the microstructure phase features described in FIG. 16. This is because the pre-sintered granular powder according to the present invention has sufficient yield strength despite having been pressed. Therefore, coarse pores having a predetermined size are formed between the granules constituting the sintered ceramic, and the shape thereof may be maintained even in the post-sintering process. Although the size of pore channels varies depending on the pressing pressure and the size distribution of granules, in the present invention, it is possible to manufacture sintered ceramics having coarse pore channels of 10 µm or more.

Furthermore, the fine pore channels are formed in the granules of the sintered ceramic according to the present invention, resulting in porous sintered reaction-bonded silicon nitride ceramics having a microstructure in which both coarse pores and fine pores are formed together.

As described hereinbefore, the present invention provides a method of manufacturing a porous sintered reaction-bonded silicon nitride ceramic and a porous sintered reaction-bonded silicon nitride ceramic manufactured using the same. According to the present invention, the sintered reaction-bonded silicon nitride ceramic has a controlled pore channel size so that both coarse pores and fine pores are formed therein, simultaneously increasing air permeability and capturing efficiency.

Also, according to the present invention, pre-sintered granular powder is not deformed even under high compacting pressure, and thus the spherical morphology of the granules can be maintained unchanged regardless of typical pressing methods, for example, uniaxial pressing, extrusion and injection molding, thus easily applying it to a filter for high-temperature/high-pressure gas or a diesel particulate filter.

Although the embodiments of the present invention have been disclosed for illustrative purposes, those skilled in the art will appreciate that a variety of different modifications, additions and substitutions are possible, without departing from the scope and spirit of the invention as disclosed in the accompanying claims. Accordingly, such modifications, additions and substitutions should also be understood as falling within the scope of the present invention.

What is claimed is:

1. A method of manufacturing a porous sintered reaction-bonded silicon nitride ceramic, the method comprising:
   granulating a material comprising silicon and a sintering additive for preparing a sintered silicon nitride from the silicon to obtain material granules;
   pre-sintering the material granules in an inert atmosphere to obtain pre-sintered granules;
   subjecting the pre-sintered granules to pressing, to produce a material compact; and
   subjecting the material compact to reaction-bonding in a nitriding gas atmosphere and post-sintering in a nitrogen atmosphere,
   wherein the sintering additive comprises at least one of alkaline earth metal oxides.

2. The method according to claim 1, wherein the post-sintering is performed at 1700~1900° C.

3. The method according to claim 1, wherein the sintering additive is used in an amount of 2~10 wt % based on complete nitridation of the silicon.

4. The method according to claim 1, wherein the pressing is performed at a pressure of 1~20 MPa.

* * * * *